United States Patent
Mesgarani et al.

(10) Patent No.: US 12,483,805 B2
(45) Date of Patent: Nov. 25, 2025

(54) AUTOMATIC TERMINATION OF IMAGE SENSOR FOR ANALOG HISTOGRAM DEPTH SENSING

(71) Applicant: Meta Platforms Technologies, LLC, Menlo Park, CA (US)

(72) Inventors: Ali Mesgarani, Sunnyvale, CA (US); Umanath Ramachandra Kamath, Palo Alto, CA (US); Augusto Ronchini Ximenes, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 225 days.

(21) Appl. No.: 18/168,360

(22) Filed: Feb. 13, 2023

(65) Prior Publication Data

US 2024/0276111 A1    Aug. 15, 2024

(51) Int. Cl.

| | |
|---|---|
| *H04N 25/50* | (2023.01) |
| *G01S 17/08* | (2006.01) |
| *G02B 27/01* | (2006.01) |
| *H02J 7/00* | (2006.01) |
| *H02J 7/34* | (2006.01) |
| *H04N 25/771* | (2023.01) |
| *H04N 25/78* | (2023.01) |

(52) U.S. Cl.
CPC ......... *H04N 25/50* (2023.01); *G02B 27/0172* (2013.01); *H02J 7/0063* (2013.01); *H02J 7/345* (2013.01); *H04N 25/771* (2023.01); *H04N 25/78* (2023.01); *G01S 17/08* (2013.01); *G02B 2027/014* (2013.01); *G02B 2027/0178* (2013.01)

(58) Field of Classification Search
CPC ...... H04N 25/50; H04N 25/771; H04N 25/78; H04N 25/773; H04N 25/77; H04N 25/705; H04N 25/57; G02B 27/0172; G02B 2027/014; G02B 2027/0178; H02J 7/0063; H02J 7/345; G01S 17/08; G01S 7/4863; G01S 7/4865; G01S 17/894
See application file for complete search history.

(56) References Cited

U.S. PATENT DOCUMENTS

| | | |
|---|---|---|
| 2012/0057152 A1 | 3/2012 | Eldesouki et al. |
| 2019/0227151 A1* | 7/2019 | Bikumandla ...... G02B 27/0087 |
| 2021/0011556 A1 | 1/2021 | Atlas et al. |
| 2021/0247502 A1* | 8/2021 | Kim ..................... G01S 7/4863 |

(Continued)

OTHER PUBLICATIONS

EPO—Partial European Search Report for European Patent Application No. 24154389.1, dated Jul. 31, 2024, 10 pages.

*Primary Examiner* — Christopher K Peterson
(74) *Attorney, Agent, or Firm* — Greenberg Traurig, LLP

(57) ABSTRACT

This disclosure describes a method of operating an image sensor and a plurality of memory cells associated with the image sensor, each memory cell comprising: one or more input lines, a stop exposure output line; a storage capacitor; and a stop exposure circuit. The method may comprise, by each of the memory cells, sensing a voltage representing an exposure event in response to the input lines being enabled, and by a first one of the memory cells, enabling the stop exposure output line in response to a charge on the storage capacitor satisfying a charge threshold; and stopping further exposure of the image sensor in response to the stop exposure output line being enabled for the first one of the memory cells.

18 Claims, 13 Drawing Sheets

(56) References Cited

U.S. PATENT DOCUMENTS

| | | | |
|---|---|---|---|
| 2023/0030480 A1* | 2/2023 | Kim | G04F 10/005 |
| 2023/0324522 A1* | 10/2023 | Henderson | G01S 7/4865 |
| | | | 356/5.01 |

\* cited by examiner

AUTOMATIC TERMINATION OF IMAGE SENSOR FOR ANALOG HISTOGRAM DEPTH SENSING

TECHNICAL FIELD

This disclosure generally relates to image sensing, and more particularly, to performing an autoexposure function for an image sensor.

BACKGROUND

Artificial reality systems are used in a wide variety of situations and applications. In general, artificial reality comprises a presentation of information in a way that creates an artificial or partially artificial view of an environment. Artificial reality systems may include, e.g., virtual reality, augmented reality, mixed reality, hybrid reality, or any combination and/or derivatives thereof. Artificial reality systems typically include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

One aspect of artificial reality systems is depth sensing. Depth sensing can be used to determine the distance from the HMD to real objects within a physical area. The real objects can then be rendered on the HMD in a way that generally corresponds to the actual location of the real objects in space. Depth sensing can be used to increase the accuracy in placement of real objects rendered by the HMD. For these and other reasons, depth sensing is desirable in artificial reality systems. Depth sensing can also be useful in many other situations and environments.

SUMMARY

In general, this disclosure is directed to techniques for operating a plurality of memory cells associated with an image sensor, as well as systems, devices, and circuits configured to implement such techniques. The techniques may help to prevent overexposure of pixels in the sensor. As one example, the techniques may be applied in the context of a depth sensor for an artificial reality system. Analog histogram on pixel is a technique which enables depth sensing by accumulating histogram information in the charge domain, and then producing depth information using the histogram information. In contrast to digital approaches, which require larger power as well as an excess amount of storage for data, an analog approach is generally compact and more energy efficient for depth sensing in real time.

One of the issues of conventional analog histogram techniques is that conventional analog histograms are generally incapable of detecting saturation, which affects the precision of the analog histogram where multiple histogram bins-corresponding to times of flight-reach saturation. Therefore, conventional analog histogram techniques do not limit or eliminate further exposure for pixels of the image sensor when saturation occurs for any of the pixels.

In some examples, this disclosure provides an analog memory cell circuit for an image sensor that automatically detects saturation and stops further exposure of the image sensor. That is, when any cell in a memory array reaches a maximum or saturation value, a stop exposure function is triggered to stop further exposure of the image sensor, which is desirable.

An analogy, to aid in a conceptual understanding of some aspects of the disclosure is to imagine the bins of a histogram as being participants in a race to the finish line, where the finish line is the saturation value. As exposure events at an image sensor occur, the bins of the histogram begin to "fill up". Once any single bin reaches the finish line, or the saturation value, all participants in the race are frozen at their current position. The fact that a particular bin reached saturation indicates that the maximum desired exposure level has occurred in that bin, and accordingly analog circuitry described herein may be configured to automatically stop further exposure functions of the image sensor based on this determination. Moreover, in some examples, the memory cell that includes the circuit that triggers the stop exposure function can be identified as the memory cell corresponding to a depth measurement. The memory cells may be sequentially enabled to detect exposure events according to a time after a corresponding photodetector cell detects light. Therefore, by latching the address of the memory cell where saturation occurred and the stop exposure function was triggered, the depth to the target can be obtained for the corresponding photodetector cell using direct time of flight (dToF) depth sensing techniques.

In some examples, this disclosure describes a memory array circuit associated with an image sensor, the memory array circuit comprising a plurality of memory cells, each memory cell comprising: one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor.

In another example, this disclosure describes a method of operating an image sensor and a plurality of memory cells associated with the image sensor, each memory cell comprising: one or more input lines, a stop exposure output line; a storage capacitor; and a stop exposure circuit. The method comprises by each of the memory cells, sensing a voltage representing an exposure event in response to the input lines being enabled; by a first one of the memory cells, enabling the stop exposure output line in response to a charge on the storage capacitor satisfying a charge threshold; and stopping further exposure of the image sensor in response to the stop exposure output line being enabled for the first one of the memory cells.

In another example, this disclosure describes a system-on-a-Chip (SoC) integrated circuit comprising: logic circuitry associated with an image sensor; and a memory array circuit associated with the image sensor, the memory array circuit comprising a plurality of memory cells, each memory cell comprising: one or more input lines; a stop exposure output line; a storage capacitor configured to sense a voltage representing an exposure event on the exposure event input line when the input lines are enabled; and a stop exposure circuit configured to enable the stop exposure output line in response to a charge on the storage capacitor satisfying a charge threshold, wherein the logic circuitry is configured to stop further exposure of the image sensor in response to the stop exposure output line being enabled.

In another example, this disclosure describes an artificial reality (AR) system comprising: a display screen for a head mounted display (HMD); and at least one SoC connected to the HMD and configured to output artificial reality content on the HMD display screen, wherein the at least one SoC comprises: logic circuitry associated with an image sensor; and a memory array circuit associated with the image sensor, the memory array circuit comprising a plurality of memory cells, each memory cell comprising: one or more input lines; a stop exposure output line; a storage capacitor configured to sense a voltage representing an exposure event on the exposure event input line when the input lines are enabled; and a stop exposure circuit configured to enable the stop exposure output line in response to a charge on the storage capacitor satisfying a charge threshold, wherein the logic circuitry is configured to stop further exposure of the image sensor in response to the stop exposure line being enabled.

In another example, this disclosure describes a system comprising a plurality of circuits, wherein each of the plurality of circuits includes a capacitor and wherein each of the plurality of circuits is configured to: receive control signals, wherein the control signals determine an address associated with one or more of the plurality of circuits and wherein the control signals identify events; incrementally discharge the capacitor for a particular one of the plurality of circuits in response to the control signals when the address identifies the particular circuit during an event; and output a logic signal in response to the capacitor of the particular one of the plurality of circuits reaching a defined level of charge, wherein the defined level of charge corresponds to a pre-defined threshold lower than an initial reset charge level of the capacitor, wherein the system further includes logic configured to: receive the logic signal from the particular one of the plurality of circuits; and identify the particular one of the plurality of circuits as having received the most events from among the plurality of circuits.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
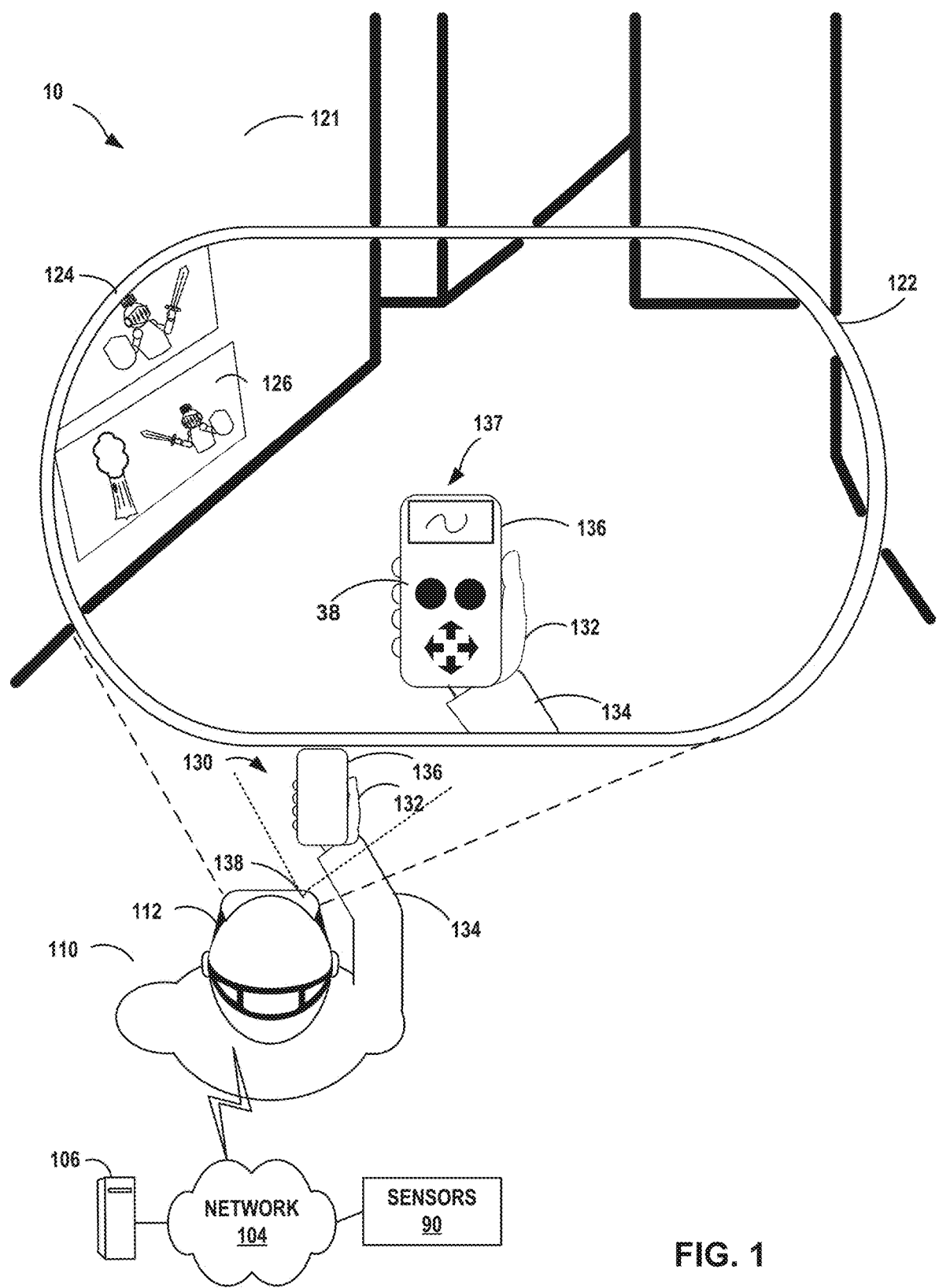
FIG. 1 is an example depiction of an artificial reality system, in accordance with techniques disclosed herein.

FIG. 1 is an illustration depicting an example artificial reality system, in accordance with techniques disclosed herein. In the example of FIG. 1, artificial reality system 10 includes a wearable device such as a head mounted display (HMD) 112. In addition, system 10 includes a peripheral device 136, and may in some examples include one or more external sensors 90 and/or console 106.

As shown in FIG. 1, HMD 112 is typically worn by user 110 and comprises an electronic display and optical assembly for presenting artificial reality content 122 to user 110. In addition, HMD 112 includes one or more sensors (e.g., accelerometers or other types of sensors) for tracking motion of the HMD 112 and may include one or more image capture devices 138 (e.g., cameras, line scanners, or other image capture devices) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, a laptop computer, or another type of console. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In the example shown in FIG. 1, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smart ring, or other wearable device. Peripheral device 136 may also be part of a kiosk, a handheld device, or other stationary or mobile system. Peripheral device 136 may or may not include a display device for outputting content to a screen.

In the example artificial reality example shown in FIG. 1, virtual content items 124, 126 are mapped to positions on wall 121. The example in FIG. 1 also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1 shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference and, based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application might not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, in some examples, multiple devices of artificial reality system 10 may work in conjunction in the AR environment, where each device may be a separate physical electronic device and/or separate integrated circuits (e.g., one or more SoCs) within one or more physical devices. In these examples, peripheral device 136 may be operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface gesture and performs an action that is rendered to HMD 112.

In accordance with the techniques of this disclosure, HMD 112 may be configured to perform imaging and depth sensing functions of this disclosure. For example, HMD 112 may include an embedded SoC that is configured to perform the imaging and depth sensing functions. As described in greater detail below, the depth sensing by the SoC of HMD 112 may implement a memory array circuit associated with an image sensor. The memory array circuit may comprise a plurality of memory cells, e.g., 128 cells, although fewer cells may be desirable for some applications and more cells may be desirable for other applications. As described in more detail below, each memory cell may comprise one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor.

Figure 2:
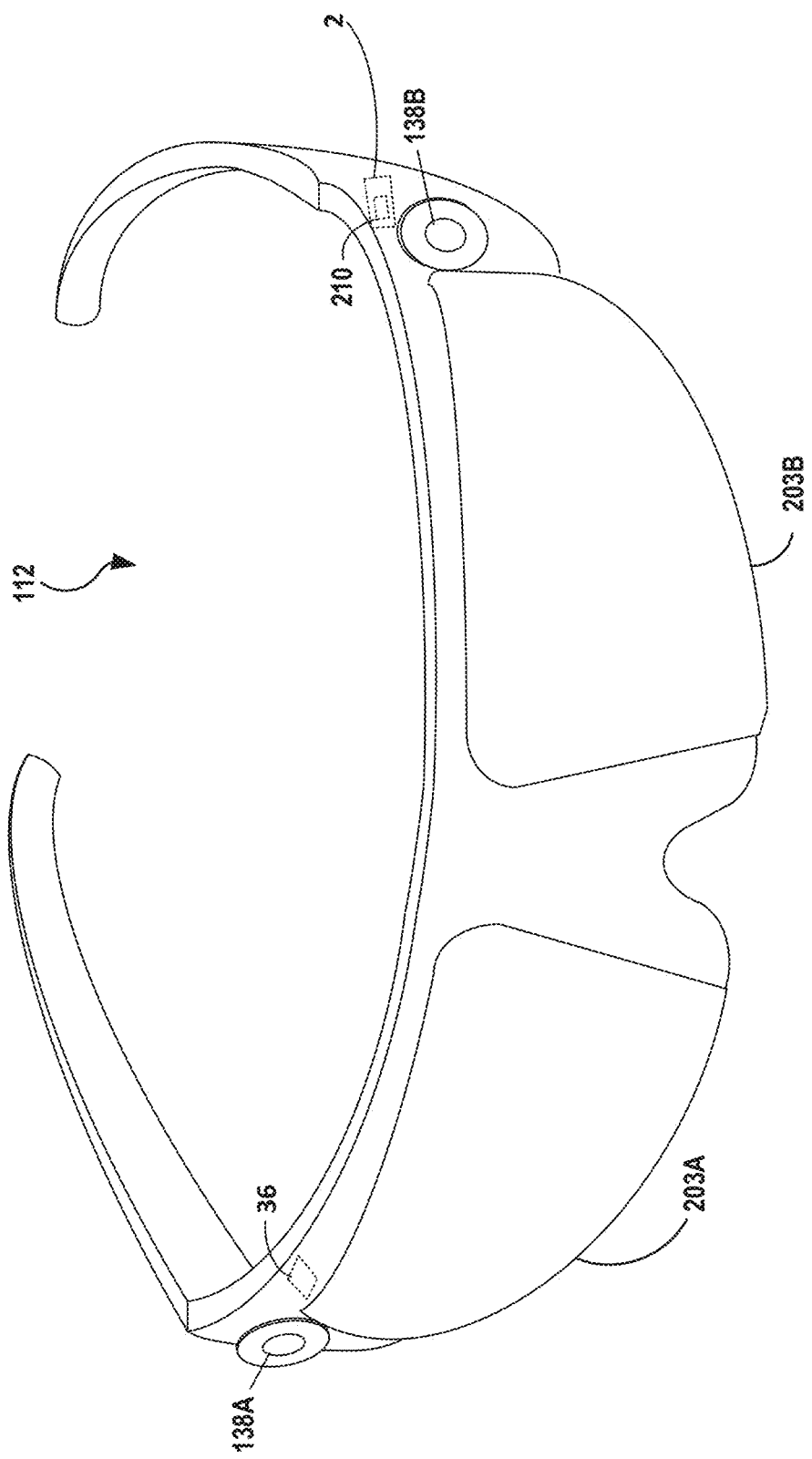
FIG. 2 is an example depiction of a head mounted display (HMD), consistent with this disclosure.

FIG. 2 is an illustration depicting an example HMD, in accordance with techniques described in this disclosure. HMD 112 of FIG. 2 may be an example of HMD 112 of FIG. 1. HMD 112 may be part of an artificial reality system, such as artificial reality system 10 of FIG. 1, or may operate as a stand-alone, mobile artificial realty system configured to implement the techniques described herein. In the example of FIG. 2, HMD 112 takes the general form factor of glasses.

In the example of FIG. 2, HMD 112 includes a front rigid body and two stems to secure HMD 112 to a user, e.g., by resting over the wearer's ears. For example, electronic display 203 may be split into multiple segments, such as into two segments, with each segment corresponding to a separate lens disposed on the rigid front body of HMD 112. In other examples in accordance with FIG. 2, electronic displays 203A-203B (collectively, "electronic displays 203") may form a contiguous surface that spans both lenses and the lens-connecting bridge (i.e., the over-the-nose portion) of the rigid front body of HMD 112. In some examples in accordance with the form factor illustrated in FIG. 2, electronic display 203 may also encompass portions of HMD 112 that connect the lenses of the front rigid body to the stems, or optionally, portions of the stems themselves. These various designs of electronic display 203 in the context of the form factor of HMD 112 shown in FIG. 2 improve accessibility for users having different visual capabilities (e.g., with respect to peripheral vision and/or central vision, nearfield vision and/or distance vision, etc.), eye movement idiosyncrasies, etc.

Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

In the example illustrated in FIG. 2, HMD 112 includes integrated image capture devices 138A and 138B (collectively, "image capture devices 138"). Image capture devices 138 may include still image camera hardware, video camera hardware, laser scanners, Doppler radar scanners, fundus photography hardware, infrared imaging cameras, depth scanners, or other types of image capture devices. Image capture devices 138 may include outward-facing and/or inward-facing image capture hardware, and include any hardware configured to capture image data representative of a surrounding physical environment, and optionally, to pre-process and/or post process the captured image data. Outward-facing camera hardware of image capture devices 138 may capture image data of the physical environment outside of HMD 112, such as, but not limited to, the real-world environment at which a wearer of HMD 112 is positioned. Inward-facing camera hardware of image capture devices 138 may capture image data of the wearer of HMD 112, such as facial images and/or retina scans. Other inward-facing sensor hardware of HMD 112 may capture other types of information pertaining to the wearer, such as temperature information or other types of information or metrics.

In some examples, one or more of image capture devices 138 of HMD 112 may be configured for depth sensing. That is, in some examples, an image capture device may include a light source for emitting suitable pulses of light (e.g., laser light) to illuminate a target object, as well as a light sensor or detector for capturing an image of the target object.

In the example illustrated in FIG. 2, HMD 112 further includes one or more motion sensors 36, such as one or more accelerometers (also referred to as inertial measurement units or "IMUs") that output data indicative of current acceleration of HMD 112, GPS sensors that output data indicative of a location of HMD 112, radar, or sonar that output data indicative of distances of HMD 112 from various objects, or other sensors that provide indications of a location or orientation of HMD 112 or other objects within a physical environment.

In the example illustrated in FIG. 2, HMD 112 includes HMD SoC 2. SoC 2 includes internal control unit 210, which may include an internal power source and one or more printed-circuit boards having one or more processors, memory, and hardware to provide an operating environment for executing programmable operations to process sensed data and present artificial reality content on display 203.

In some examples, control unit 210 is configured to, based on the sensed data (e.g., image data captured by image capture devices 138, position information from GPS sensors), generate and render for display on display 203 a virtual surface comprising one or more virtual content items (e.g., virtual content items 124, 126 of FIG. 1) associated with a position contained within field of view of image capture devices 138. As explained with reference to FIG. 1, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view. In some examples, a virtual surface is associated with a position on a planar or other surface (e.g., a wall), and control unit 210 will generate and render the portions of any virtual content items contained within that virtual surface when those portions are within the field of view.

In some examples, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface 137 including one or more UI elements (e.g., virtual buttons) on surface of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

Image capture devices 138 may capture image data representative of various objects, including peripheral device 136 and/or of the hand(s) of user 110 in the physical environment that are within the field of view of image capture devices 138, which may generally correspond to the viewing perspective of HMD 112.

According to this disclosure, SoC 2 may implement a memory array circuit associated with an image sensor. The memory array circuit may comprise a plurality of memory cells, e.g., 128 cells, although fewer cells may be desirable for some applications and more cells may be desirable for other applications. Each memory cell may comprise one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor.

Figure 3:
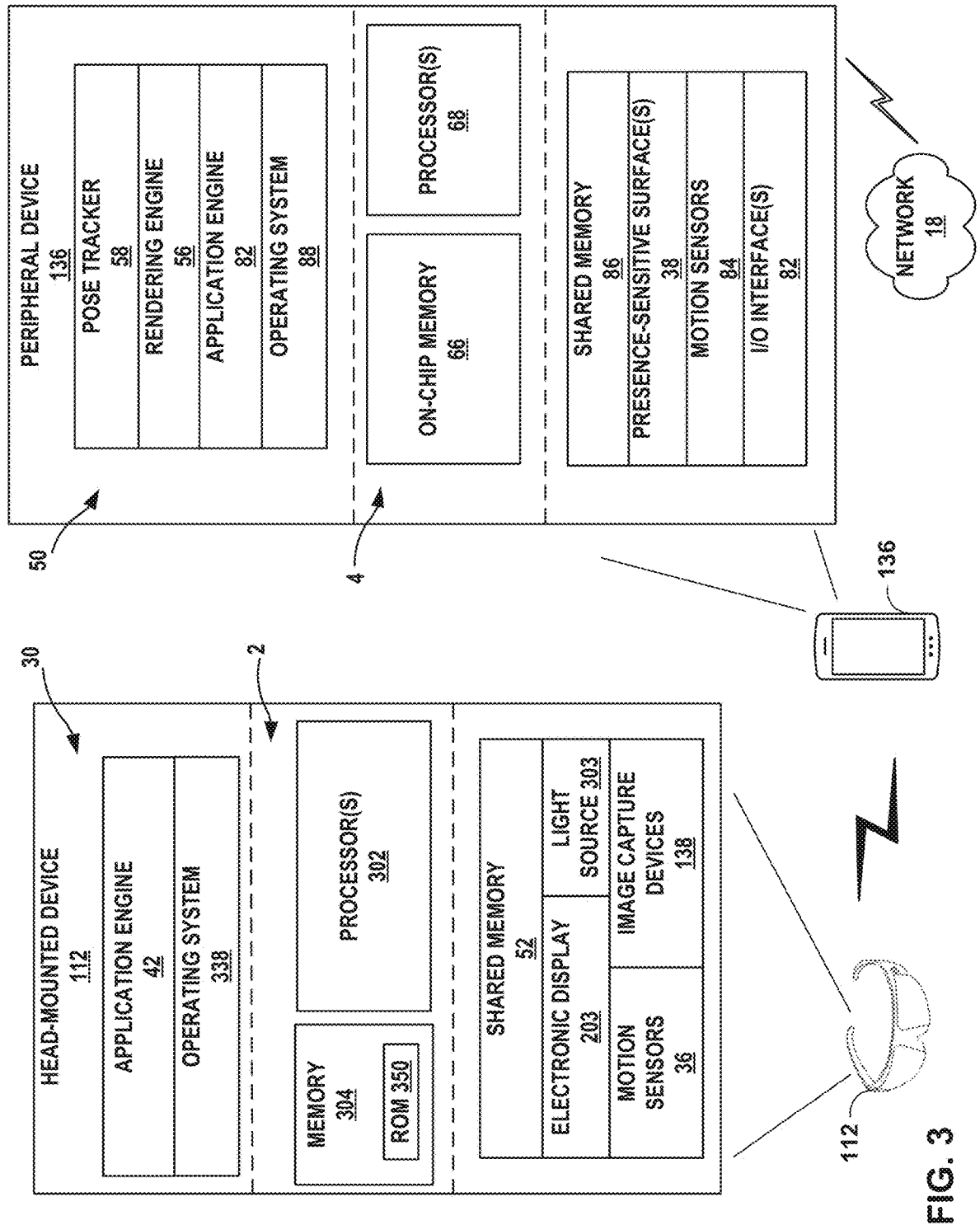
FIG. 3 is a block diagram showing an example implementation of an HMD and a peripheral device of the multi-device artificial reality system of FIG. 1, consistent with techniques of this disclosure.

FIG. 3 is a block diagram showing an example implementation of an HMD and a peripheral device of the multi-device artificial reality system of FIG. 1, consistent with techniques of this disclosure. FIG. 3 illustrates an example of HMD 112 and peripheral device 136 according to aspects of this disclosure. The HMD 112 of FIG. 3 may be an example of the HMD 112 described above and illustrated in FIG. 1 and FIG. 22; and the peripheral device 136 may be an example of the peripheral device 136 described above and illustrated in FIG. 1. HMD 112 includes HMD SoC 2. SoC 2 which may include an internal power source and one or more printed-circuit boards having one or more processors, memory, and hardware to provide an operating environment for executing programmable operations to process sensed data and present artificial reality content on display 203.

Surface 38 of peripheral device 136 represents an input component or a combined input/output component of peripheral device 136. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 136 to receive touch input or gesture input without direct contact with surface 38. User 110 may provide these touch or gesture inputs to peripheral device 136 to provide instructions directly to peripheral device 136, or indirectly to HMD 112 and/or other components of an artificial reality system in which HMD 112 is deployed. In some examples, a processor of HMD 112 may utilize image capture devices 138 to analyze configurations, positions, movements, and/or orientations of peripheral device 136, of the hand(s) or digit(s) thereof of a user of peripheral device 136 to enable to provide input using gestures such as drawing gestures or typing gestures provided via a graphical keyboard.

Peripheral device 136 can communicate data to HMD 112 (and/or console 16) using wireless communications links (e.g., Wi-Fi™, near-field communication of short-range wireless communication such as Bluetooth®, or one or more other communication links), or using wired communication links, or combinations thereof, or using other types of communication links. In the example of FIG. 3, peripheral device 136 is also communicatively coupled to a network 18 (e.g., network 104 of FIG. 1), thereby enabling peripheral device 136 to communicate data to remote devices over the network 18.

In this way, peripheral device 136 may offload various hardware and resource burdens from HMD 112, which enables low-profile form factor designs of HMD 112. Peripheral device 136 also serves as a communications intermediary between HMD 112 and devices at remote locations, via network 18. Further details of peripheral device 136 are described in U.S. patent application Ser. No. 16/506,618 (filed on 9 Jul. 2019), the entire content of which is incorporated herein by reference.

Peripheral device 136 may also include peripheral SoC 4. SoC 4 includes internal control unit 220, which may include an internal power source and one or more printed-circuit boards having one or more processors, memory, and hardware to provide an operating environment for executing programmable operations to process sensed data and perform functions offloaded from HMD 112.

In the example illustrated in FIG. 3, SoC 2 of HMD 112 includes one or more processors 302 and memory 52. Shared memory 52 and processor(s) 302 of HMD 112 may, in some examples, provide a computer platform for executing an operating system 338. Operating system 338 may represent an embedded, real-time multitasking operating system, for instance, or other type of operating system. In turn, operating system 338 provides a multitasking operating environment for executing one or more software components 30, including application engine 42.

Processor(s) 302 may be coupled to one or more of electronic display 203, motion sensors 36, light source 303, and/or image capture devices 138. Processor(s) 302 are included in HMD SoC 2, which also includes on-chip memory 304. On-chip memory 304 is collocated with processor(s) 302 within a single integrated circuit denoted as HMD SoC 2 in the particular example shown in FIG. 3. Processor(s) 302 may use on-chip memory 304 as a temporary storage location for self-contained data processing performed within HMD SoC 2.

HMD 112 is communicatively coupled to peripheral device 136, as shown in FIG. 3. In some examples, peripheral device 136 and HMD 112 function in tandem as co-processing devices to deliver the artificial reality experiences to user 110 as described above with respect to FIGS. 1, 2, and 3. Peripheral device 136 may offload portions of the computing tasks otherwise performed by HMD 112, thereby enabling a reduced hardware infrastructure and therefore a lower-profile form factor with respect to the design of HMD 112.

Peripheral device 136 includes presence-sensitive surface 38 (described above with respect to FIG. 1), as well as input/output (I/O) interface(s) 82, and motion sensors 84. Peripheral device 136 may invoke I/O interface(s) 82 to send and receive data over network 18, such as cipher text or plain text (unencrypted) data. I/O interface(s) 82 may also incorporate hardware that enables peripheral device 136 to communicate wirelessly with HMD 112. Peripheral device 136 may invoke motion sensors 84 to detect and track motion by the user of HMD 112 for use in computing updated pose information for a corresponding frame of reference of HMD 112.

Peripheral SoC 4 of peripheral device 136 includes on-chip memory 66 and one or more processors 68. On-chip memory 66 represents memory collocated with processor(s) 68 within a single integrated circuit denoted as peripheral SoC 4 in the particular example shown in FIG. 3. Processor (s) 68 may use on-chip memory 66 as a temporary storage location for self-contained data processing performed within peripheral SoC 4.

Shared memory 86 and processor(s) 68 of peripheral device 136 provide a computer platform for executing an operating system 88. Operating system 88 may represent an embedded, real-time multitasking operating system, for instance, or other type of operating system. In turn, operating system 88 provides a multitasking operating environment for executing one or more software components 50.

Apart from operating system 88, software components 50 include an application engine 82, a rendering engine 56, and a pose tracker 58. In some examples, software components 50 may not include rendering engine 56, and HMD 112 may perform the rendering functionalities without co-processing with peripheral device 136. In general, application engine 82, when invoked, provides functionality to provide and present an artificial reality application, e.g., a teleconference application, a gaming application, a navigation application, an educational application, a training application, a simulation application, or the like, to user 110 via HMD 112. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 122 (e.g., incorporating 3D artificial reality content) for display to user 110 by application engine 82 of HMD 112.

Application engine 82 and rendering engine 56 may construct artificial reality content 122 for display to user 110 in accordance with current pose information for a frame of reference, typically a viewing perspective of HMD 112, as determined by pose tracker 58. Based on the current viewing perspective as determined by pose tracker 58, rendering engine 56 constructs artificial reality content 122 (e.g., 3D artificial content) which may in some cases be overlaid, at least in part, upon the real-world 3D environment of user 110.

During this process, pose tracker 58 operates on sensed data received from HMD 112, such as movement information and user commands, and, in some examples, data from any external sensors 26 (shown in FIG. 1), to capture 3D information within the real-world environment, such as motion by user 110 and/or feature tracking information with respect to user 110. Based on the sensed data, pose tracker 58 determines a current pose for the frame of reference of HMD 112 and, in accordance with the current pose, constructs artificial reality content 122 for communication, via one or more I/O interfaces 72, to HMD 112 for display to user 110.

Each of processors 302 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 86, on-chip memory 304, or on-chip memory 66 may comprise any form of memory for storing data and executable software instructions, such as random-access memory (RAM), Static RAM (SRAM), read only memory (ROM), programmable read only memory (PROM), erasable programmable read only memory (EPROM), electronically erasable programmable read only memory (EEPROM), or flash memory.

In some examples, memory 304 comprises ROM 350, which is a read-only memory. In some examples, ROM 350 stores instructions for executing operating system 305. In some examples, ROM 350 stores instructions for performing a boot-strapping operation at power-on of HMD 112 (or SoC 2) to initialize and execute operating system 305. ROM 350 typically stores a collection of various sub-routines, many of which have a pre-defined deterministic control flow. Other sub-routines stored by ROM 350 may be determined at run-time, such as one-time programming (OTP) write, servicing alarms or interrupts, execution of patches, or other routines.

According to this disclosure, SoC 2 of HMD 112 may be configured to perform depth sensing using analog histogram on pixel techniques. In doing so, image capture devices 138, memory 304, processors 302, light source 303, and/or shared memory 52 may be used. For example, memory 304 may include a memory array circuit associated with an image sensor associated with image capture device 138. The memory array circuit may comprise a plurality of memory cells, e.g., 128 cells, although again, fewer cells may be desirable for some applications and more cells may be desirable for other applications. Each memory cell may comprise one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor.

Figure 4:
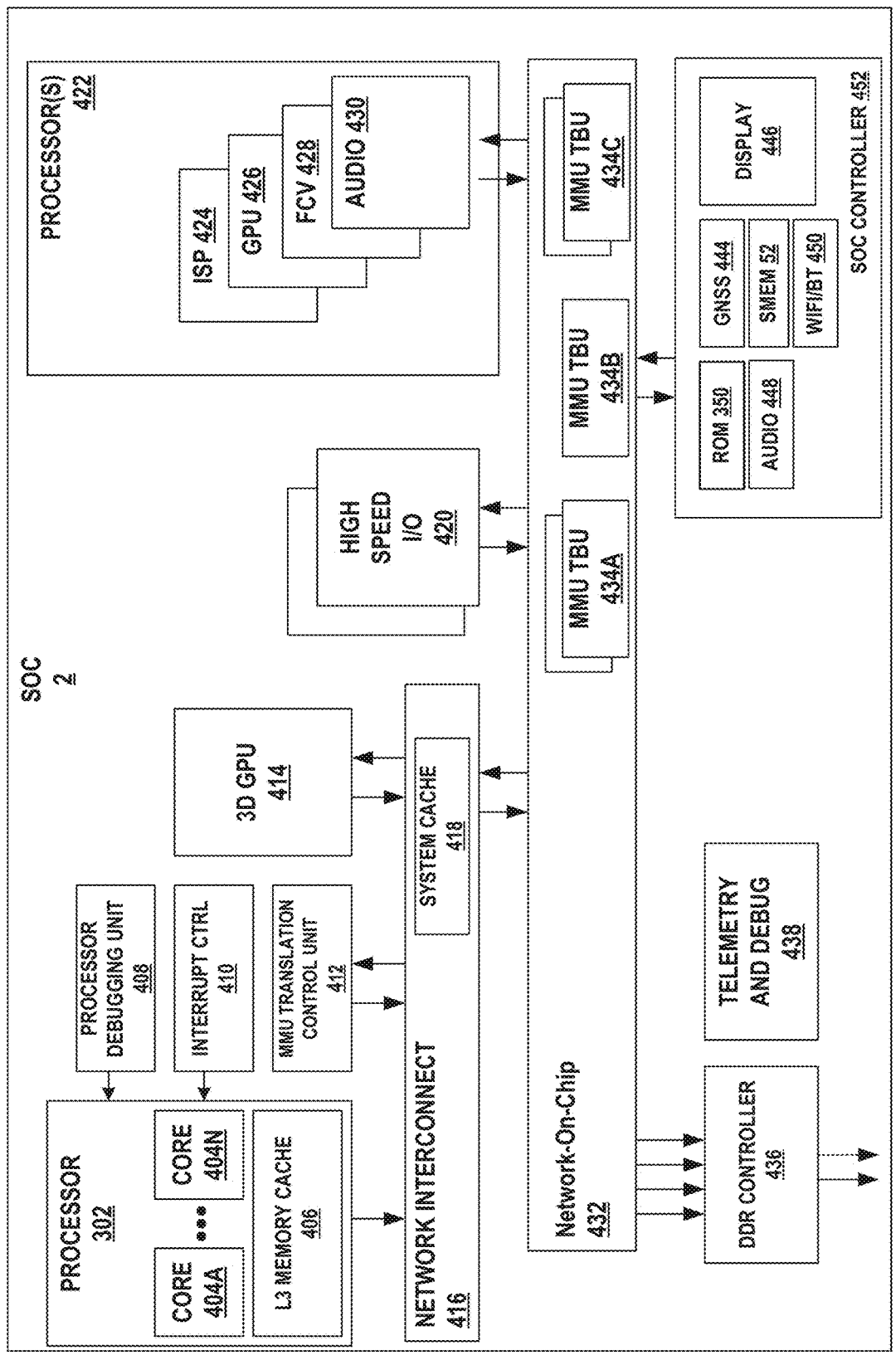
FIG. 4 is a block diagram illustrating an example SoC that may be integrated within the HMD of FIG. 1, 2, or 3, in accordance with the techniques of the disclosure.

FIG. 4 is a block diagram illustrating an example SoC 2 that may be integrated within the HMD 112 of FIG. 1, FIG. 2, or FIG. 3 in accordance with the techniques of the disclosure. In some aspects, SoC 2 includes processor 302, 3D GPU 414, high-speed I/O 420, peripheral processors 422, Network-on-Chip (NoC) integrated circuit 432, DDR controller 436, and controller 452.

Processor 302 may comprise one or more microprocessors, DSPs, ASICs, FPGAs, or any other equivalent integrated or discrete logic circuitry, as well as any combinations of such components. In some examples, processor 302 comprises a plurality of processing cores 404A-404N (collectively, "cores 404"). Processor 302 further comprises L3 memory cache 406. L3 memory cache 406 comprises a common memory cache shared by cores 404. Processor debugging unit 408 provides debugging capabilities for processor 302. Interrupt controller 410 services interrupts generated by processor 302 and/or SoC 2.

3D graphic processing unit (GPU) 414 is a graphics processing unit that may be configured to provide 3-dimensional (3D) graphics processing capabilities. In some examples, 3D GPU 414 comprises a plurality of cores or cells configured to provide parallel processing capabilities for rendering 3D images or video.

High-speed I/O 420 may provide high-speed input and output capabilities to SoC for communicating with components exterior to SoC 2, such as with other components of HMD 112 or peripheral device 136.

Processors 422 provide dedicated processors for different types of data serviced by SoC 2. Processors 422 may include integrated circuitry or hardware configured to process specific types of data. For example, processors 422 may include image signal processor (ISP) 424 for processing images, GPU 426, FCV 428, and audio processing unit 430.

Network interconnect 416 provides a high-speed interconnection medium between various components of SoC 2, particularly to data transferred between processor 302, 3D GPU 414, memory management unit (MMU) translation control unit (TCU) 412, and MMU translation buffer units (TBUs) 434A-434C of NoC integrated circuit 432, high-speed I/O 420, processors 422, and DDR controller 436. Network interconnect 416 may include a system cache 418 for storing and/or buffering data transferred between various components of SoC 2.

SoC 2 further includes telemetry and debug unit 438. Telemetry and debug unit 438 may record and transmit telemetry for SoC 2 to an external device, such as HMD 112 or peripheral device 136. Further, telemetry and debug unit 438 may provide debugging functionalities for SoC 2.

SoC controller 452 provides various controllers for driving various functionality of SoC 2. For example, SoC controller 452 includes ROM 350, shared memory 52, audio controller 448, GNSS 444, WIFI and Bluetooth® controller 450, and display controller 446.

In some examples, image signal processor (ISP) 424 is configured to perform the techniques of this disclosure. In particular, ISP 424 may be configured to perform depth sensing using analog histogram on pixel techniques. ISP 424 may include a memory array circuit associated with an image sensor, and the memory array circuit may comprise a plurality of memory cells, e.g., 128 cells. Each memory cell may comprise one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor. An image sensor (e.g., image capture devices 138) of HMD 112 may be configured to stop further exposure of the image sensor in response to the stop exposure line being enabled.

Figure 5A:
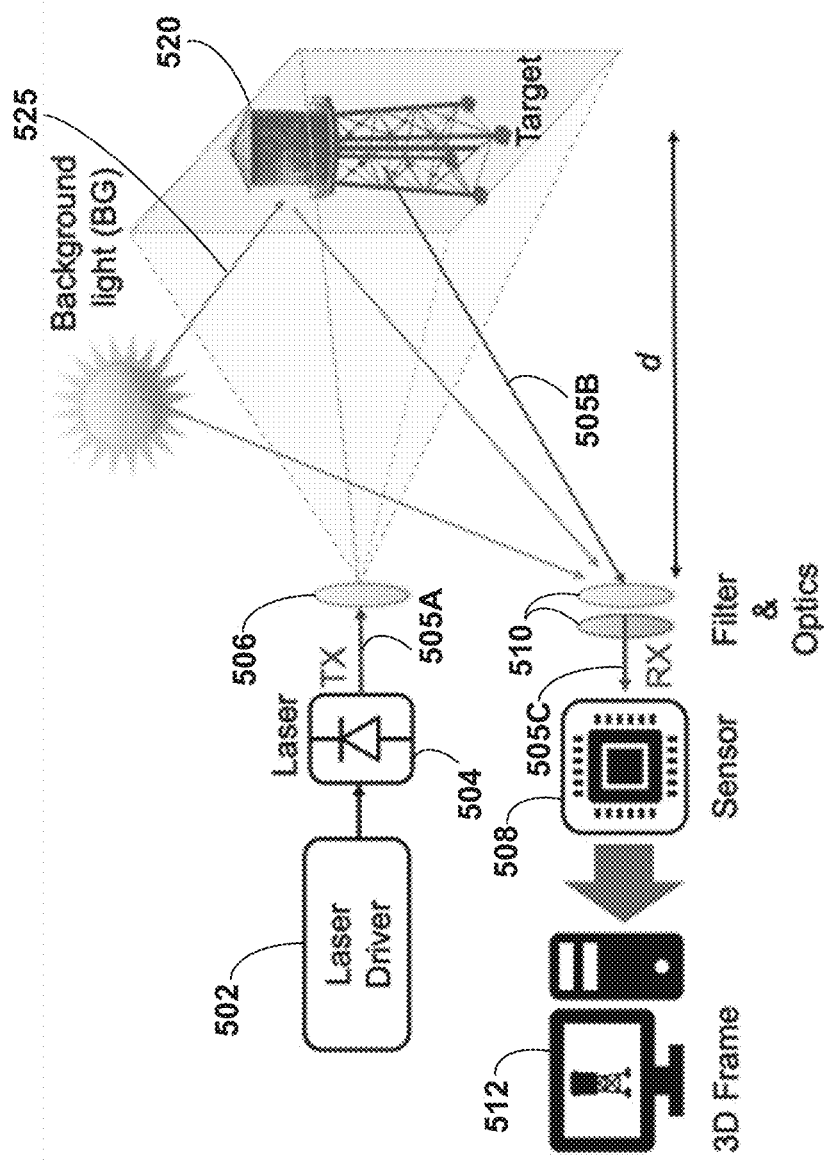
FIG. 5A is a conceptual diagram to illustrate principles of analog histogram depth sensing.
Figure 5B:
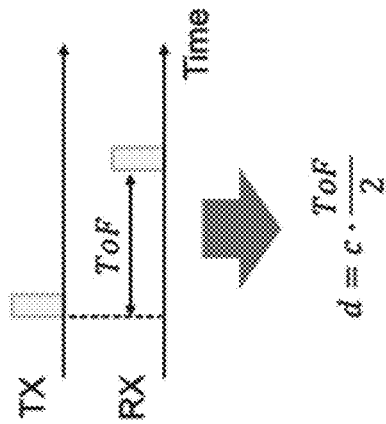
FIG. 5B is a graph with a corresponding equation for determining depth based on time of flight (ToF) of a laser signal.

FIG. 5A is a conceptual diagram to illustrate principles of analog histogram depth sensing. An image sensor, such as image capture devices 138 (FIG. 3), may include a laser 502, a laser driver 504, transmission optics 506, reception optics and filters 510, and sensors 508 (e.g., an image sensor). The image sensor transmits a laser 505A towards the environment. Laser light 505B reflects from a target 520, e.g., an object, and the reflected laser light 505C is captured by reception optics and filters 510 and sensed by sensors 508. As shown in FIG. 5B, the time between the transmission of the laser light and the reception of the reflected laser light can be used to determine the distance d (also called depth) to the target 520. The depth information, in turn, can be used in generating an accurate rendition of target 520 in a 3D image frame 512.

Unfortunately, the light captured by reception optics and filters 510 and sensed by sensors 508 includes background light 525. In other words, reception optics and filters 510 captures reflected laser light 505C but also captures noise from background light 525. For this reason, pixels of sensors 508 do not measure a single instance of light capture and instead, capture multiple instances to create a histogram of depth signal events over time. The histogram includes a plurality of bins—corresponding to times of flight—that are enabled sequentially over time so that each bin represents a different time of flight event. The histogram, then, can be used to identify actual objects or targets. The histogram essentially acts as a filter of background noise, relative to a single lighting, time of flight, event measurement. An image processor can use the peak of the histogram curve as the location of an actual depth target.

Figure 7:
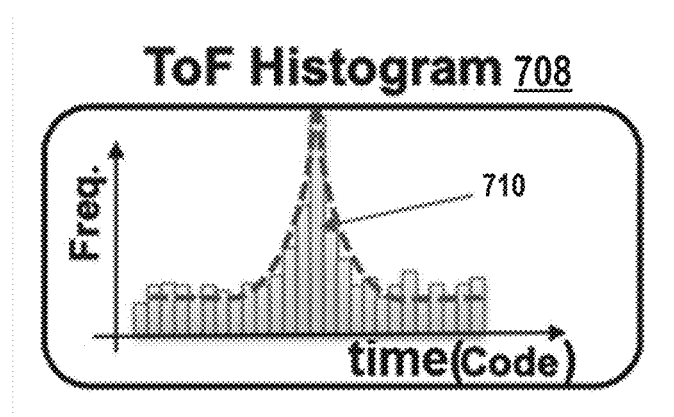
FIG. 7 is a conceptual graph illustrating a histogram associated with analog histogram depth sensing for an individual pixel of an image sensor.

FIG. 5B is a graph with a corresponding equation for determining depth based on time of flight (ToF) of a laser signal. FIG. 5B shows how depth is calculated based on a single instance, but these principles also apply to the use of a histogram curve, which again, includes a plurality of bins, which correspond to different time of flight measurements. FIG. 7 is a conceptual illustration of a time of flight (ToF) histogram indicating sensed light events. As shown, the peak location (e.g., bin 710) of the ToF histogram 708 may correspond to the actual estimated location of the target. Using bin 710 as determined from ToF histogram, an image processor (e.g., ISP 424) may be configured to determine the distance or depth (d) to a target by applying the equation and ToF techniques shown in FIG. 5B.

Figure 6:
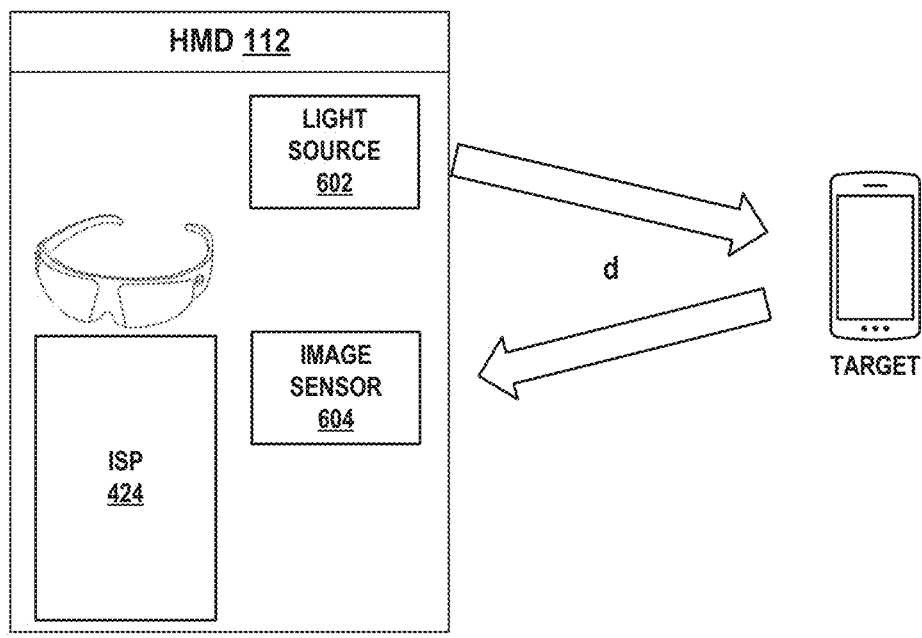
FIG. 6 is a block diagram illustrating a HMD that may be configured to determine depth of a target located in space.

FIG. 6 is a simplified conceptual diagram to illustrate principles of depth sensing. In this example, HMD 112 includes a light source 602, such as a laser, driver, and associated optics. HMD also includes an image sensor 604 to detect instances of the reflected laser light that reflects from a target. The target can be any object. ISP 424 forms histograms of instances of reflected light (similar to the description above with the example shown in FIG. 5A). Using the histograms, ISP 424 may be configured to determine the distance or depth (d) to a target by applying the equation and ToF techniques shown in FIG. 5B. Moreover, according to this disclosure, ISP 424 may be configured to generate the histograms in a way that improves upon conventional analog histogram on pixel techniques. For example, ISP 424 may include an analog memory cell circuit that is configured to automatically detect saturation for any given pixel location. Upon detecting saturation of a pixel, ISP 424 may be configured to stop further exposure of the image sensor 604. That is, when any cell in a memory array reaches a maximum or saturation value, a stop exposure function is triggered to stop further exposure of the image sensor, which is desirable.

Again, as an analogy, to aid in a conceptual understanding of some aspects of the disclosure is to imagine the bins of histogram 708 as being participants in a race to the finish line, where the finish line is the saturation value of memory cells, e.g., the point where the memory cells are generally incapable of detecting addition events. As exposure events at an image sensor occur, the bins of the histogram begin to fill up. Once any single bin reaches the finish line, or the saturation value, all participants in the race are frozen at their current position. The fact that a particular bin reached saturation indicates that the maximum desired exposure level or maximum possible exposure level has occurred in that bin, and accordingly, analog circuitry described below triggers a stop exposure function based on this determination. In the example shown in FIG. 7, the bin 710 of the ToF histogram 708 may correspond to the bin that "won" the race to saturation. In this case, ToF histogram 708 may be considered complete, without capturing any additional events for any of the bins.

Figure 8:
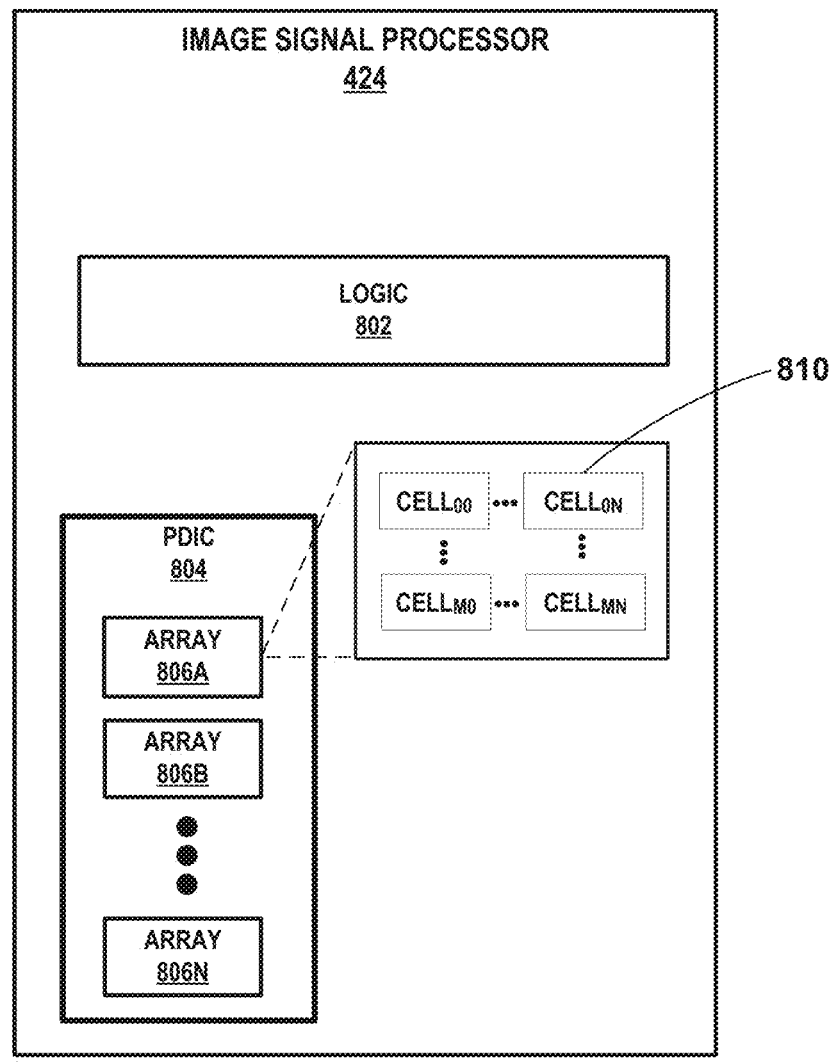
FIG. 8 is a block diagram of an example image signal processor, consistent with this disclosure.

FIG. 8 is a block diagram of an example image signal processor (ISP) 424, consistent with this disclosure. In the illustrated example, ISP 424 may include multiple interacting circuits or components, such as a photodetector integrated circuit (PDIC) 804 and a logic circuit 802, which may include a read out integrated circuit (ROIC). PDIC 804 is one example of an image detector consistent with this disclosure. Logic 802 may be configured to perform some aspects of techniques of this disclosure, and logic 802 may include logical OR circuit 942 shown in FIGS. 9A-9E and described below. PDIC circuit 804 may include one or more arrays 806A-806N of single photon avalanche diode (SPAD) photodetectors. When an exposure event occurs at a SPAD photodetector, each SPAD creates a current, which may be converted into a pulse. The timing of these current pulses can be used to detect the depth to a given target. In various examples, the PDIC 804 or the logic IC 802 may include an array of memory cells 810 associated with each photodetector. Examples of the memory cells are shown and described in FIGS. 9A-9E below. Each memory cell may act as an accumulator for a given cell. Thus, if there are 128 photodetector cells, there would be a corresponding 128 memory cells for accumulating pulses for each of the photodetector cells. Each of the photodetector cells may correspond to a pixel of an image sensor, and since the image sensor pixels are enabled sequentially over time, each event at a pixel of the image sensor and may correspond to a different time of flight event that is detected. ISP 424 may scan over the pixels over time, with one time step for each accumulator. That is, when there is an exposure event on the photodetector at the time corresponding to a given accumulator, that accumulator may be incremented by one. In this way, the ISP 424 builds a histogram for each pixel of the photodetector.

To accurately map an environment surrounding an artificial reality system, an artificial reality system may include a depth camera. For inclusion in a head mounted display of an artificial reality system, such a depth camera should have a small form factor and low power consumption.

Referring again to FIG. 6, HMD 112 may be configured for depth sensing in accordance with some aspects of the disclosure. Direct time-of-flight (dToF) depth sensing configurations measure a roundtrip travel time of photons generated by multiple short pulses of light from a light source 602 synchronized with an image sensor 604. The light source 602 may be any suitable light source for illuminating a target object with light and may be one example of light source 303 at HMD 112. The image sensor (e.g., detector) any suitable photodetector, and may be one example of image capture device 138 at HMD 112. In many dToF configurations, single-photon detectors are used, such as single-photon avalanche diodes (SPADs). The depth to an object, or half of the travel distance, can then be extracted from the speed of light c, according to $d=c\tau/2$, where $\tau$ is the travel time. dToF allows multiple events (e.g., detections of photons) to be acquired in a histogram 708 through a process called time-correlated single-photon counting (TCSPC), where the returning signal is effectively timestamped using cells 810 (each of cells 810 corresponding to a time window within a time period after a light pulse) and accumulated around an accumulation bin coupled to detectors in a location corresponding to a target location, while noise from internal and background illumination noise is uniformly distributed over the measurement range, allowing depth estimation under low signal to noise conditions. That is, in some examples, the HMD 112 may generate a histogram 708 of photon arrival times and then process the histogram to estimate the depth to a target object by identifying the bin 710 with the peak value. The depth corresponds to the peak bin 710 in the histogram 708, representing the time $\tau$ of the greatest number of exposure events following a sequence of light pulses.

To obtain data more efficiently from a detector of an active depth sensor, a depth camera assembly of HMD 112 includes an ISP 424 that is configured to capture, in accordance with receiving instructions from a processor, one or more images of the local area including reflected light including portions of light emitted by the light source 602 of HMD 112 and reflected from target objects in the local area. The reflected light captured by image sensor 604 is reflected from the one or more target objects in the local area. In various examples of this disclosure, ISP 424 may comprise a two-dimensional array of pixels. However, in other examples, the active depth sensor includes a single detector or multiple detectors positioned relative to each other (e.g., a line of detectors). In examples, each pixel includes a SPAD. Pixels of the detector may be grouped into macropixels including a number of rows of pixels and a number of columns of pixels. In some examples, a macropixel includes an equal number of rows of pixels and columns of pixels. For example, a macropixel can include 16 rows of pixels and 16 columns of pixels for a total of 256 pixels. However, in other examples, a macropixel includes any number of rows of pixels and any number of columns of pixels. In some examples, each macropixel of the detector includes a common number of rows of pixels and includes a common number of columns of pixels.

Hence, in various examples, the ISP 424 includes an array of macropixels. Each macropixel comprises a plurality of pixels configured to capture light from the local area surrounding the HMD 112. Based on one or more control signals, a macropixel of the array can be selected. The ISP 424 may internally generate the control signals or receive the control signals from an external source, such as a console.

FIGS. 9A-9E illustrate a memory array 900 including a plurality of memory cells (e.g., as examples of cells 810 of array 806A of FIG. 8) and FIGS. 10A-10E depicting respective timing diagrams illustrating functional operations of a memory cell according to some aspects of the disclosure. Consistent with this disclosure, a plurality of macropixels may each include one or more pixels having a charge-based memory cell. This allows a pixel to store a count of photon detection events captured by a pixel. Charge-based memory cells in multiple pixels may be arranged into an array that is accessed by a timing reference that is synchronized with emission of light by the light source 802. Each cycle of the timing reference addresses a different charge-based memory cell included in a pixel, thus enabling the memory cell to register a photon detection event; each memory cell thus represents a bin for a histogram of photon detection events by the pixel. In some cases, multiple pixels of a macropixel may operate in parallel, with photon detection events stored in arrays of charge-based memory cells included in different pixels used to store values that represent the different bins of a histogram of photon detection events by the pixels of the macropixel, with the timing reference providing timing information for the photon detection events stored in different charge-based memory cells. Using a charge-based memory cell in each pixel allows for compact storage of photon detection events by a pixel, enabling overall dimensions of the ISP 424 to remain compact.

In some detectors, when a memory cell accumulates a set of analog measurements corresponding to a histogram, the image signal processor may read out the memory cells and send their signals to an analog to digital convertor, to convert the stored voltages to digital values. A digital processor can then create a histogram and perform digital peak detection for each histogram. As described above, the peak bin in the histogram represents the time of flight of the light pulse from the light source to the detector.

According to one or more aspects of the present disclosure, rather than digitizing the values stored in the memory cells and creating digital histograms to determine the peak bins of each histogram, the memory array 900 may be configured to create an analog histogram-on-pixel and stop exposure when a given bin of the histogram reaches a maximum (e.g., saturated) value. Each memory cell of memory array 900 has circuitry that automatically detects when the memory cell has been saturated to a maximum value, and based on this event, sends a stop exposure signal to stop further exposure of the photodetectors. A given memory cell reaches its maximum value, e.g., when its storage capacitor 924 is discharged sufficiently such that reset transistor 922 reaches its threshold voltage and automatically turns on. For a given depth sensing event, the memory cell that first detects it has been saturated represents the peak bin of the histogram of values of all memory cells in memory array 900, for that memory cell received the highest number of detection events while active/selected during an exposure. That memory cell was, in effect, the "first across the finish line" represented by the maximum value and corresponds to the mode of the ToF bins in a ToF histogram of the values of all memory cells in memory array 900. The ToF corresponding to that memory cell can be computed using the timing reference, and the ToF can be used to compute distance information.

In a further aspect of the disclosure, a logic circuit (e.g., logic 802) associated with memory array 900 may latch the address of the memory cell where the peak value triggered the stop exposure line. In this way, the memory cell address where the peak occurs may be automatically determined and identified from the memory cell.

In FIGS. 9A-9E, a memory array 900 is illustrated as one example. Memory array 900 may be one example of a memory array 806A, 806B, or 806N illustrated in FIG. 8, including a plurality of memory cells 810. Each memory cell has a corresponding memory address. In FIGS. 9A-9E, an array of 128 memory cells is shown with addresses {amem[0] . . . amem[127]}. Each memory cell 902, 904, 906 is coupled to an input of a logical OR circuit 942, e.g., an OR gate. Logical OR circuit 942 may correspond to a portion of logic 802 shown in FIG. 8. Logic 802 may include analog, digital, and/or logic circuitry.

Memory array 900 may be of any dimension (e.g., 1D, 2D, or 3D). The memory array 900 depicted in FIGS. 9A-9E is arranged with the memory cells in rows and columns. Accordingly, each memory cell 902, 904, 906 may include row select line 910 and column select line 912, and these row and column addresses are different for different memory cells 902, 904, 906. When both the row select line 910 and the column select line 912 for a given memory cell are high, the memory cell is "enabled" or "active" or "selected" to register an exposure event occurring in the time window corresponding to the memory cell. Each memory cell 902, 904, 906 further includes an event line 914 coupled to a photodetector such as a SPAD. Here, the event line 914 goes high when a corresponding photodetector detects an exposure event (e.g., a photon at the corresponding pixel). Each memory cell may further include storage capacitor 924, labeled $C_{mem}$, and a reset transistor 922. Reset transistor 922 can be controlled by switches 918, 920, e.g., to force a reset at the beginning of the process. In the illustrated memory cell 902, when storage capacitor 924 is reset, switches 918 and 927 are closed to turn on reset transistor 922 and storage capacitor 924 is reset to the voltage VDD−VTH1, where VTH1 is the threshold voltage of the reset transistor 922. Reset transistor 922, for example, may comprise an NMOS transistor that defines a threshold voltage, e.g., VTH1. Using an NMOS for reset transistor 922 has advantages relative to a PMOS for reset transistor 922 insofar as an NMOS may have reduced leakage relative to a PMOS.

Storage capacitor 924 is coupled to the gate of a readout transistor 934, which is configured as a buffer of the charge on storage capacitor 924. For readout of the charge on storage capacitor 924, which is buffered on readout transistor 934, output transistor 936 is used. In particular, output transistor 936 is configured to output the charge on readout transistor 936 in response to a readout input signal, and this readout does not cause charge leakage from storage capacitor 924 since readout transistor 934 operates as a buffer.

Reset transistor 922 has a threshold voltage. If the voltage of the storage capacitor 924 goes very low (e.g., many exposure events have occurred and the storage capacitor 924 has substantially discharged), the source voltage of reset transistor 922 falls below this threshold voltage due to the low charge on the capacitor, e.g., at node 950, forcing transistor 922 to turn on. When transistor 922 is forced on, this causes transistor 930 to turn on. In particular, transistor 930 may comprise a PMOS transistor with an inverted gate that turns on transistor 930 when the gate goes low, which occurs when transistor 922 is forced on, due to low charge on storage capacitor 924. This results in an output signal on stop exposure line 932, which causes the system (e.g., logic 802) stop further exposure of the image sensor. According to techniques of this disclosure, if any storage capacitor 942 of any of memory cell 902, 904, 906 goes below a threshold, this means that that corresponding memory cell has "won the race." In this case, that memory cell that "won the race" is the memory cell at the peak of the histogram, and its address can be latched as being memory cell associated with the peak of the histogram.

According to aspects of the disclosure, the circuit of the memory cell may be configured to track the voltage of the storage capacitor 942 at node 950. When the voltage of the storage capacitor 942 falls below a certain level, transistor 922 is forced on, and the memory cell triggers a stop exposure line 932. The stop exposure line 932 from any of the memory cells turns on logical OR circuit 942 and causes the memory array 900 to stop accumulating exposure events.

Operation of the memory array 900 will now be described in conjunction with FIGS. 9A-9E and corresponding graphs of FIGS. 10A-10E. Memory array 900 may be one example of a memory array 806A, 806B, or 806N illustrated in FIG. 8, including a plurality of memory cells 810. Logical OR circuit 942 may correspond to logic 802 or a portion thereof. Logic 802 may also be referred to as logic circuitry.

Memory array circuit 900 may comprise a memory array associated with an image sensor, such as described herein. The memory array circuit 900 comprises a plurality of cells (shown as 902, 904, 906). In this example, there are 128 cells, although fewer cells may be used, or a greater number of cells may be used. Each of the memory cells 902, 904, 906 includes one or more input lines. In this example, the one or more input lines include a row select input line 910, a column select input line 912, and an exposure event input line 914. However, other types of addressing schemes could be used to enable individual memory cells, and the input lines of FIGS. 9A-9E are merely one example that is useful for image sensors.

Each of the memory cells 902, 904, 906 also includes a stop exposure output line 932. Moreover, each of the memory cells 902, 904, 906 includes a storage capacitor 924 configured to sense a voltage representing an exposure event on the exposure event input line when the input lines are enabled. For example, each of the memory cells 902, 904, 906 may be configured to sense the voltage representing the exposure event enabled on the exposure event input line 914 when the column select input line 910 and the row select input line 912 are enabled for a particular memory cell. In sensing the voltage representing the exposer event, the storage capacitor is configured to incrementally discharge, in response to the exposure event, i.e., when the one or more input lines are enabled for that particular memory cell.

Each of the memory cells 902, 904, 906 also includes a stop exposure circuit configured to enable the stop exposure output line in response to a charge on the storage capacitor satisfying a charge threshold. A reset transistor 922 is coupled to storage capacitor 924 for resetting the charge on storage capacitor 924 to a nominal voltage in response to a reset of the memory array circuit 900, wherein the reset transistor is controlled by one or more switches 918, 920, which may comprise transistors for resetting the voltage on capacitor 924. Once reset, capacitor 924 has an initial charge of VDD−VTH1, where VTH1 refers to threshold voltage associated with reset transistor 922. Then, as noted above, in sensing the voltage representing the exposure event, storage capacitor 924 is configured to incrementally discharge, in response to each exposure event, i.e., when the one or more input lines are enabled for that particular memory cell.

The stop exposure circuit of memory cell 902 may comprise a stop exposure transistor 930 coupled to the reset transistor 922, wherein the stop exposure transistor 930 is configured to turn on when the reset transistor is forced on, e.g., in response to a condition where the storage capacitor satisfies the threshold. In other words, as described herein, when the voltage of storage capacitor 924 is incrementally discharged to a level that falls below the gate voltage of reset transistor 922, e.g., below VREF, this forces reset transistor 922 to turn on. This automatic "forced" turn on of reset transistor 922 is different than a controlled reset that uses switches 918, 920. Instead, the "forced" turn on of reset transistor 922 is caused automatically, due to the voltage on capacitor 924 falling below the gate of resent transistor 922. Then, the automatic turn on of reset transistor 922 causes stop exposure transistor 930 to turn on, which in turn sends a logic high signal to enable stop exposure line 932. When stop exposure lines 932 is enabled this causes a logic high to logical OR circuit 942, which sends a stop exposure command to stop further exposure of the image sensor. Accordingly, the first memory cell with the capacitor that discharges a level of VREF may be declared the winner and the peak of the analog histogram.

Each memory cell 902, 904, 906 comprises a readout line 940 and each memory cell includes a readout transistor 934 configured as a buffer of the charge on storage capacitor 924. An output transistor 936 is configured to output the charge on readout transistor 934 in response to a readout input signal 938. In response to a first memory cell (i.e., the winner) of the plurality of memory cells 902, 904, 906 selecting (i.e., enabling) its stop exposure line 932, logic 802 associated with memory array 900 may be further configured to latch the address of the first memory cell so as to identify the winner. Again, logical OR circuit 942 is configured to receive the stop exposure lines of each of the memory cells 902, 904, 906, logic circuitry (e.g., logic 802) may be configured to stop further exposure of the image sensor in response to an output of the logical OR circuit 942 being enabled, indicating a condition where a given exposure line associated with a given one of the memory circuits is enabled.

FIGS. 10A-10E show different signals associated with memory cell 902 over time. Line 1002 is a logical reset signal. Line 1004 is a logical trigger signal. Line 1006 represents the voltage at node 950, e.g., the voltage on capacitor 924 and the voltage on the source of reset transistor 922. Line 1008 represents the voltage on node 952, e.g., the gate of reset transistor 922. Line 1010 represents the threshold that triggers the end of the race for discharging capacitor 924, and this threshold may be programmable or tunable for different dynamic ranges. As an illustrative example, the dynamic range of discharging capacitor 924 may be on the order of 1 Volt, and this may allow for N incremental discharge events on capacitor 924, where N is on the order of approximately 1000 events. Each incremental discharge, in this example may reduce the voltage on capacitor 924 by approximately 0.001 volts. These voltage values for dynamic range and incremental discharge events are merely examples, however, and other voltages and dynamic ranges may be used, consistent with the teaching of this disclosure.

Figure 9A:
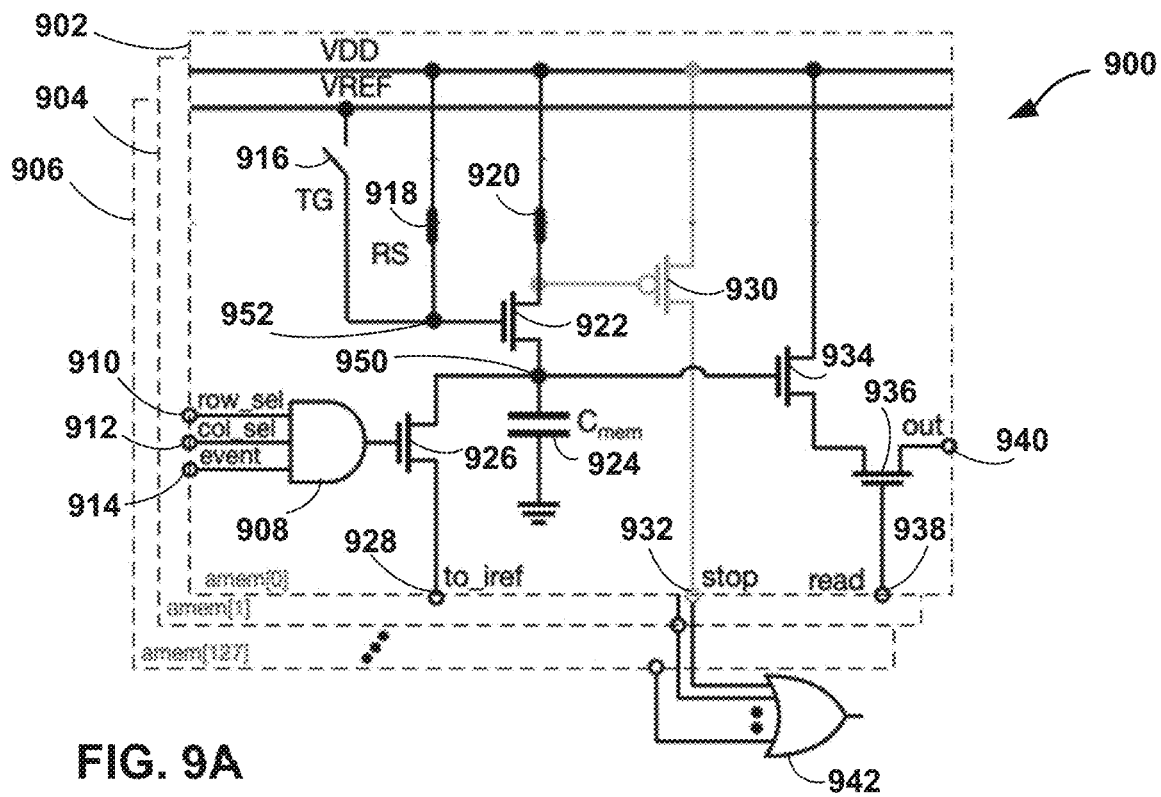
FIGS. 9A-9E are combined block and circuit diagrams of a memory array circuit of an image sensor consistent with this disclosure.
Figure 10A:
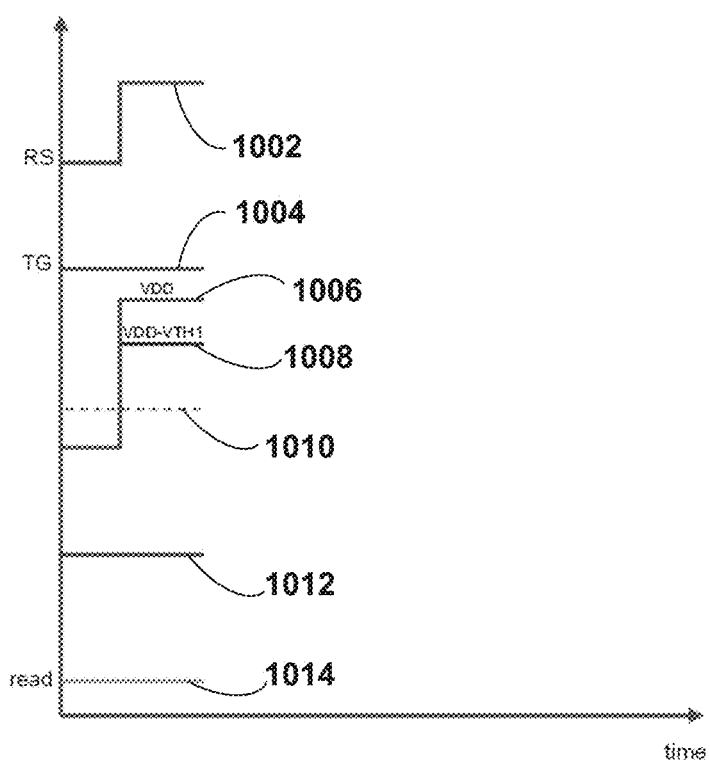
FIGS. 10A-10E are graphs showing various signals associated with the memory array circuit shown in FIGS. 9A-9E.

Referring specifically to FIGS. 9A and 10A, when signal 1002 is logic high as shown in FIG. 10, this causes switches 918, 920 to close, which resets the voltage on storage capacitor 924 to VDD−VTH1 as shown in signal 1008, where VTH1 is the voltage drop over reset transistor 922. Trigger signal 1004 is logic low in FIG. 10A, and the gate of resent transistor 922 is at VDD, e.g., at node 952. In this case, stop exposure signal 1012 is logic low and readout signal 1014 is logic low.

Figure 9B:
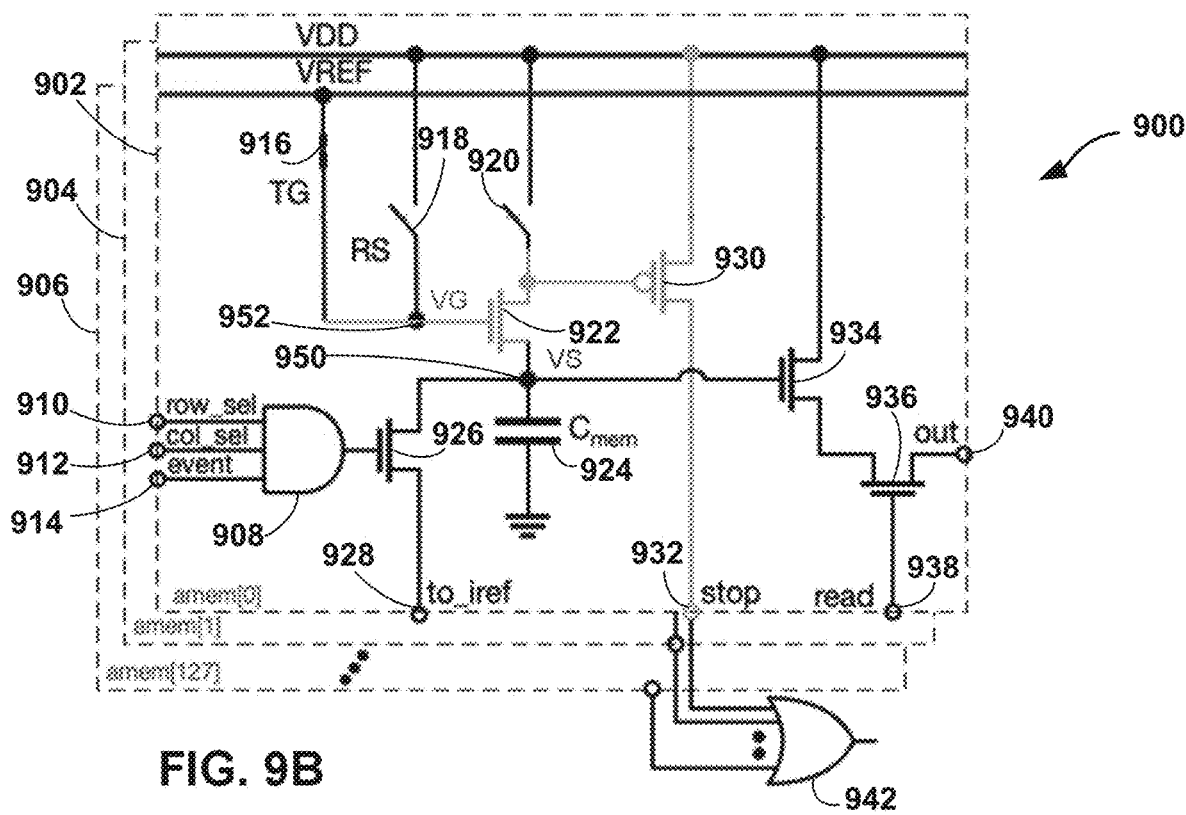
Figure 10B:
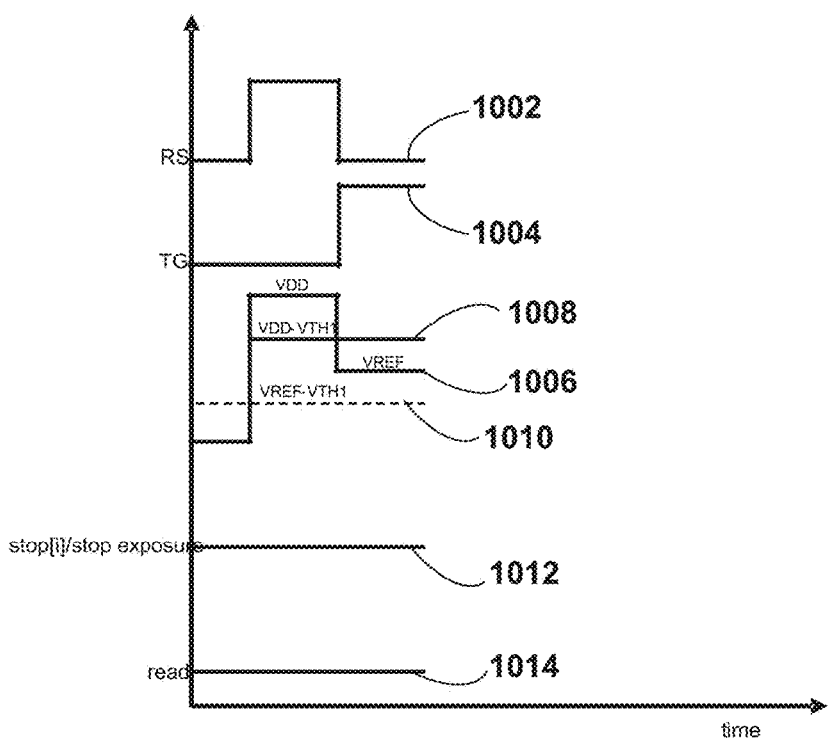

As shown in FIGS. 9B and 10B, reset signal 1002 goes to logic low and trigger signal 1004 goes to logic high. This changes the voltage at the gate of reset transistor 922 at node 952 to VREF, which is the threshold for discharge of storage capacitor 924 that will trigger a stop exposure event. Thus, the voltage on storage capacitor 924 shown by signal 1008 at node 950 is higher than the voltage at the gate of reset transistor 922 at node 952. The triggering event of signal 1004 starts the process of tracking discharge events via the charge stored on storage capacitor 924. At this point shown in FIG. 10B, stop exposure signal 1012 remains logic low and readout signal 1014 remains logic low.

Figure 9C:
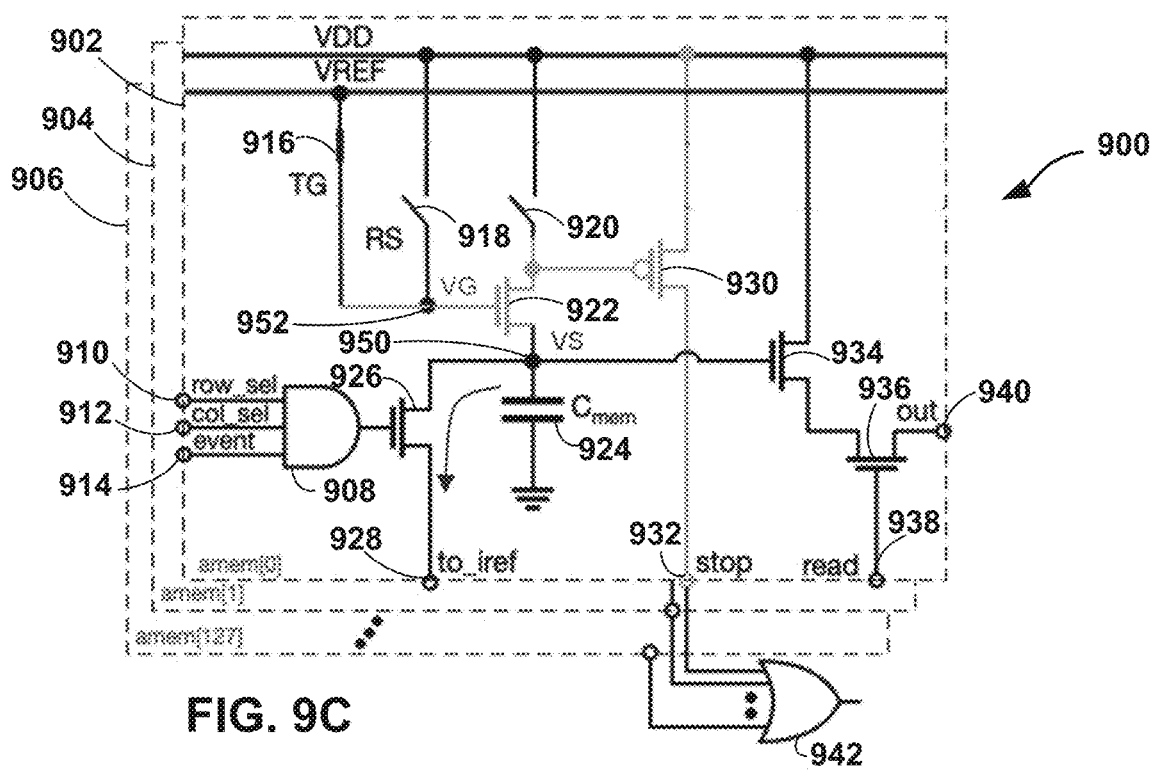
Figure 10C:
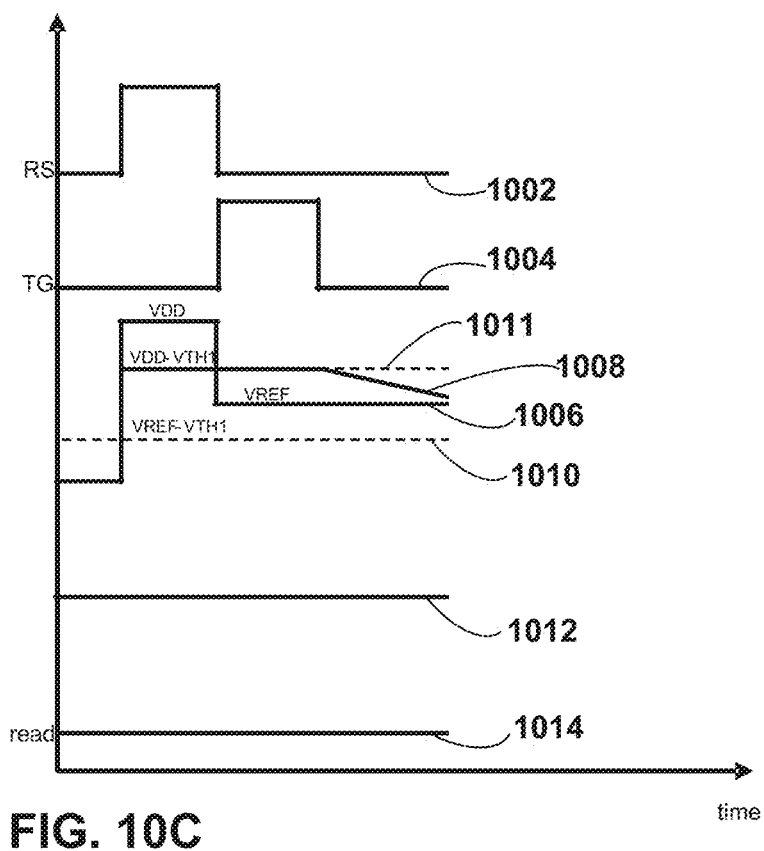

As shown in FIGS. 9C and 10C trigger signal 1004 is shown as going low, but in some cases, trigger signal 1004 may remain high to avoid leakage from node 952 to maintain the gate of resent transistor 922 at VREF. As shown in FIG. 10C, signal 1008 reduces, e.g., incrementally, due to discharge events. Discharge events can be identified by one or more input signals that enable a discharge event and identify a particular one of memory cells 902, 904, or 906. For example, each of memory cells 902, 904, 906 may include a selector circuit 908 connected the gate of an enable transistor 926. Selector circuit 908 may comprise an AND gate that outputs a gate control signal to turn on the enable transistor 926 when row select line 910, column select line 912, and event line 914 are all logic high. Again, however, other types of addressing or circuit selection schemes could be used. The enable transistor 926 is switched on for a brief period to cause an incremental discharge from storage capacitor 924, e.g., to a current reference line 928 (labeled Iref). As these incremental discharges occur, the voltage of signal 1008 falls incrementally. At this point, as shown in FIGS. 9C and 10C, stop exposure signal 1012 remains logic low and readout signal 1014 remains logic low.

Figure 9D:
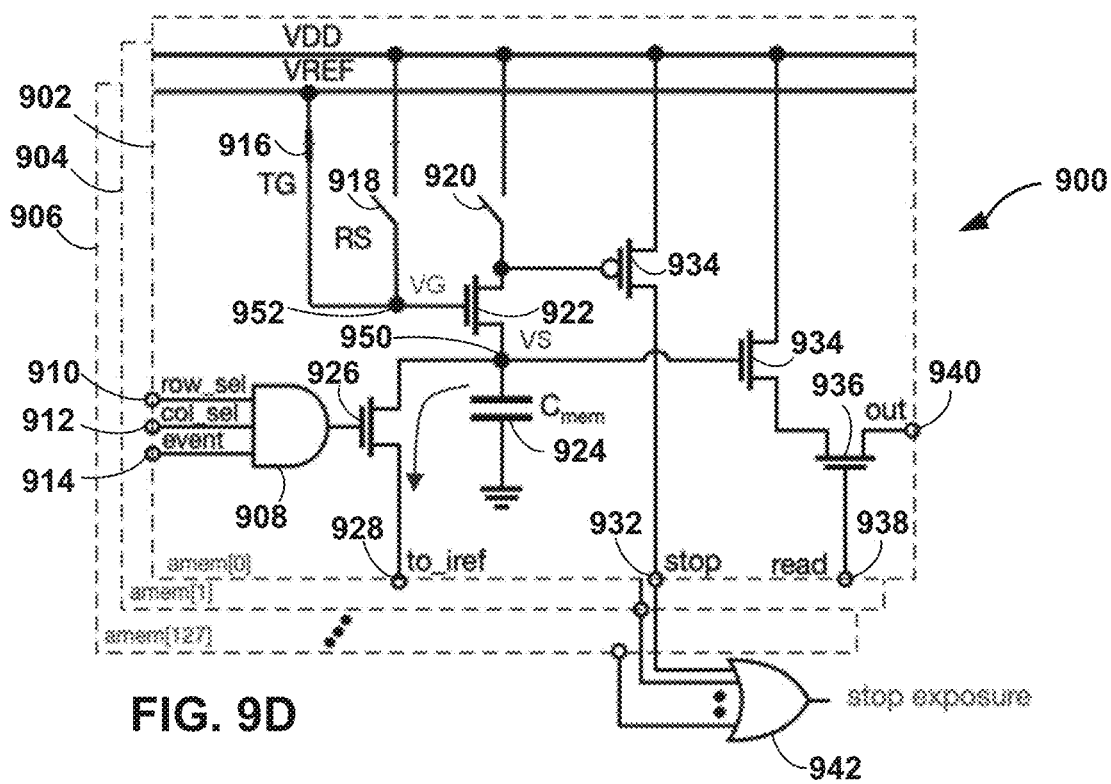
Figure 10D:
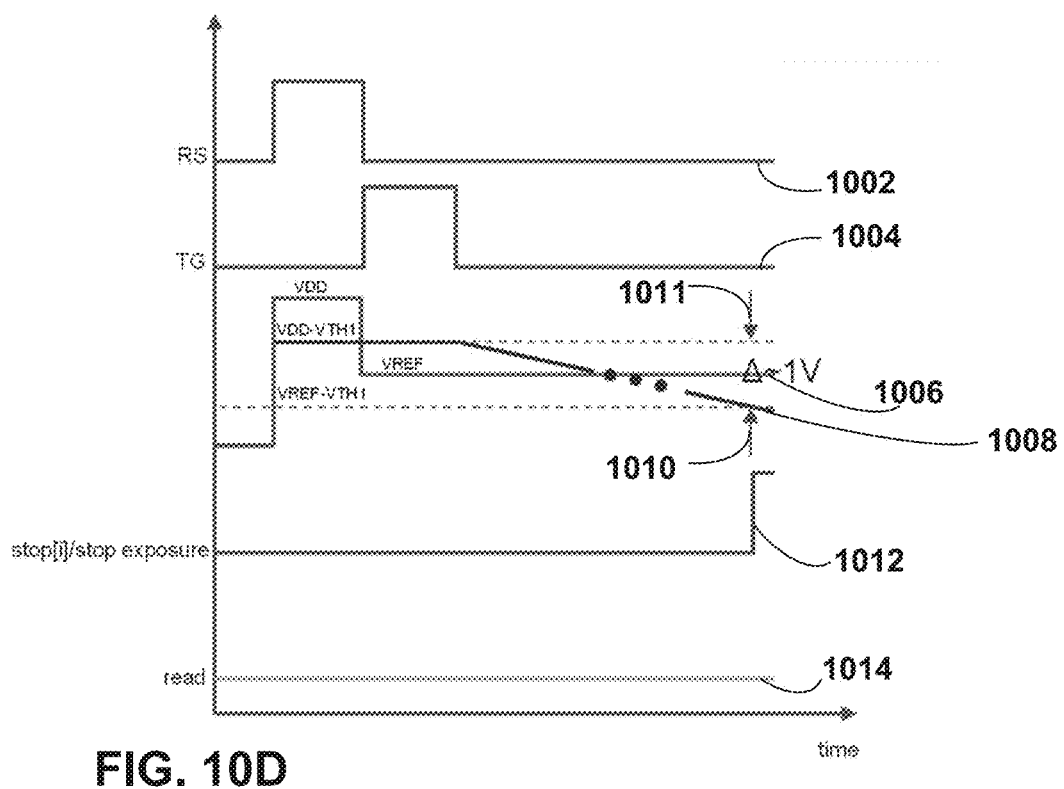

As shown in FIGS. 9D and 10D, when the voltage of signal 1008 reaches the threshold defined at line 1010, this causes that corresponding memory cell to enable its stop exposure output line 932. This is shown in signal 1012 moving from logic low to logic high when signal 1008 reaches the threshold defined by line 1010. Lines 1010 and 1011 may define the dynamic range of capacitor 924, which is essentially operating as an event sensor and counter of such events. As shown in FIG. 10D this dynamic range may be on the order of approximately 1 volt, although both the upper threshold value 1011 and the lower threshold value 1010 could be modified or changed in various examples, and these values may be programmable by tuning the circuit for different situations or applications. Also, the discharge events may reduce the charge incrementally by approximately 0.001 volt increments, but these increments can also be adjusted, pre-defined, or tuned by controlling the on-time of enable transistor 926 for respective events.

Figure 9E:
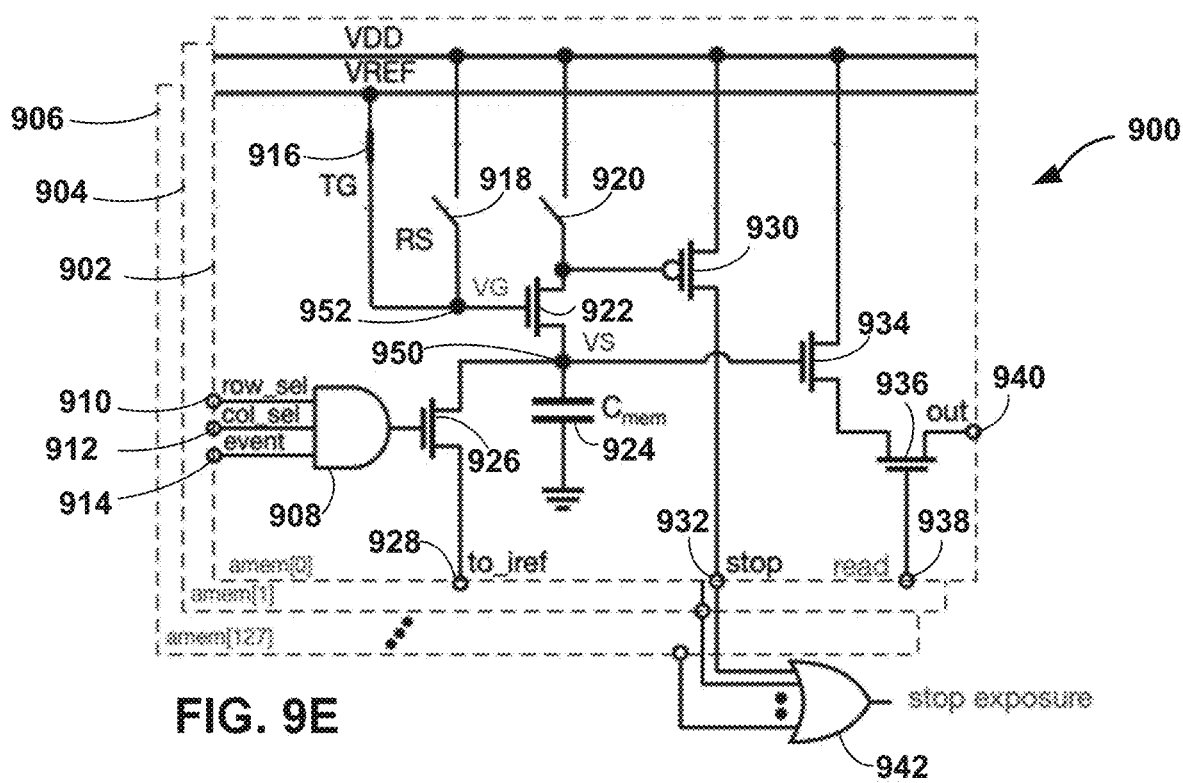
Figure 10E:
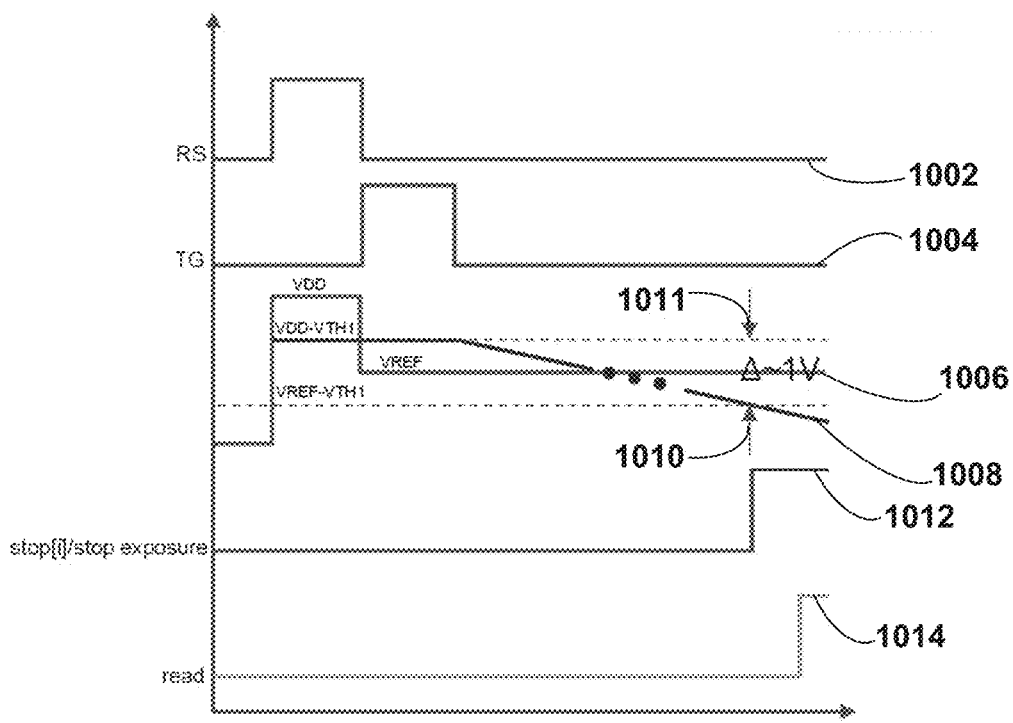

As shown in FIGS. 9E and 10E, after the stop exposure signal 1012 is enabled, a readout signal may be enabled 1014. For readout, a read signal is sent on line 938 causing transistor 936 to output the buffered charge stored on transistor 934, which is indicative of the charge on capacitor 924. Moreover, in some examples, the memory address of the corresponding sensor circuit that "won the race" can be latched by an associated logical circuit, such as logic 802, as the peak value of the histogram used for analog histogram on pixel depth sensing techniques.

If any of the memory cells turns on its stop exposure line 932, this means that the memory cell has reached its maximum exposure level. Once one memory cell reaches its maximum exposure level, it can be assumed that other bins in the histogram are getting closer to the saturation level as well. Without a stop exposure mechanism more and more bins will become saturated and it becomes more difficult to accurately detect the bin corresponding to the peak. Thus, as illustrated in FIG. 10E, when the stop exposure line 932 for any memory cell is selected, the ISP 424 may stop the exposure of the SPAD sensor and latch the address of the memory cell (or the corresponding SPAD sensor) where the stop exposure line 932 was set. The memory address at the stop exposure transition represents the peak memory address, from which the depth of a sensed target object can be obtained as described above.

As discussed above, ISP 424 operates by sequentially cycling through memory cells, incrementing each memory cell's stored value (by incrementally discharging the storage capacitor) if there is an event when that memory cell's row and column select lines are selected. Thus, for the first memory cell that reaches the maximum incremental value (represented by the storage capacitor 924 falling to the voltage VREF−VTH1), ISP 424 latches the address of that memory cell, which represents the address of the peak signal. Thus, various aspects of this disclosure can function for auto-exposure as well as for peak detection for depth sensing. The auto exposure function occurs because the sensor is automatically stopped from further exposure when any bin in any pixel's histogram is saturated. Peak detection is accomplished by latching the address of the memory cell that triggered the stop exposure line, providing the address of the memory cell where the peak value occurred.

Although described in the context of analog histogram on pixel techniques, the circuits of this disclosure, e.g. using a discharging capacitors to detect and count other events, and trigger the end of the process when a given circuit has discharged its capacitor to a threshold, could also be applied in other situations or setting.

Thus, in some examples, this disclosure describes, more broadly, a system comprising a plurality of circuits (such as memory cells or other types of circuits). Each of the plurality of circuits includes a capacitor (like the discharge capacitors described herein) and each of the plurality of circuits is configured to: receive control signals (e.g., signals on lines 910, 912, 914 or other types of control signals), wherein the control signals determine an address associated with one or more of the plurality of circuits and wherein the control signals identify events; incrementally discharge the capacitor for a particular one of the plurality of circuits in response to the control signals when the address identifies the particular circuit during an event; and output a logic signal (e.g., signal 1012 or a similar type of signal) in response to the capacitor of the particular one of the plurality of circuits reaching a defined level of charge, wherein the defined level of charge corresponds to a pre-defined threshold lower than an initial reset charge level of the capacitor. In this case, the system further includes logic (e.g., logical OR circuit 942 or a similar type of circuit) configured to: receive the logic signal from the particular one of the plurality of circuits; and identify the particular one of the plurality of circuits as having received the most events from among the plurality of circuits. The system may be configured to disable or reset the plurality of circuits in response to the logic receiving the logic signal from the particular one of the plurality of circuits. The capacitor of the particular one of the plurality of circuits reaching the defined level of charge causes a threshold voltage of a transistor to be exceeded, thereby outputting the logic signal, such as in the examples described herein or in other examples.

Figure 11:
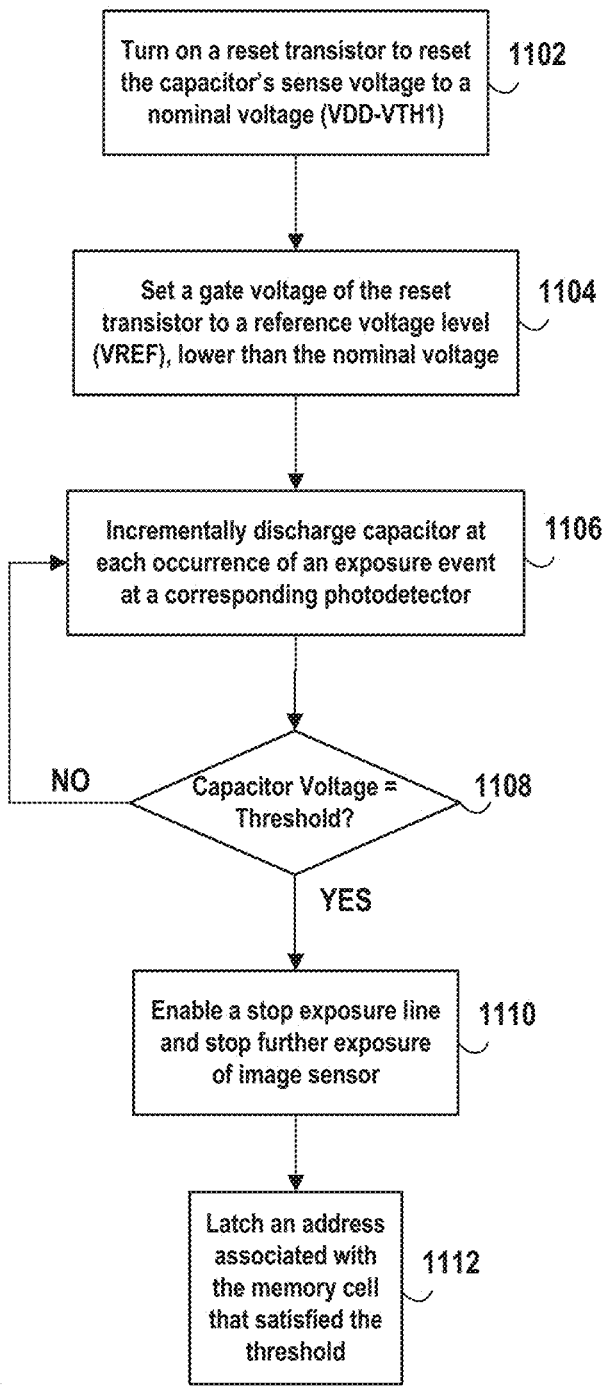
FIG. 11 is a flow diagram showing an example technique of this disclosure.

FIG. 11 is a flow diagram illustrating a process consistent with one or more examples of this disclosure. As shown in FIG. 11, for a given memory cell 902 of a plurality of memory cells 902, 904, 906, reset transistor 922 is turned on via switches 918, 920 to reset a voltage on capacitor 924 to a nominal voltage, e.g., VDD−VTH1 (1104). Then, after reset, trigger switch 916 is controlled to set a gate voltage of reset transistor 922 to a reference voltage (VREF), which is lower than the nominal voltage. Circuit elements 908, 926 are configured to cause storage capacitor to sense a voltage representing an exposure event, e.g., causing an incremental discharge of storage capacitor 924 at each occurrence of an exposer event at a corresponding photodetector (1106). The process of incrementally discharging the storage capacitor 924 at each occurrence of exposer events continues as long as the sensed capacitor voltage is greater than the threshold (NO branch of 1108). Once the capacitor voltage equals (or falls below) the threshold (NO branch of 1108), memory cell 902 is configured to automatically enable a stop exposer line 932, which causes logical OR gate 942 to issue a stop exposure signal that stops further exposer of the image sensor (1110), which also stops the event counting for memory array 900 (1110). The system latches an address associated with the memory cell that satisfied the threshold (1112). The latched address may comprise the address location of the memory.

Consistent with the method shown in FIG. 11 and consistent with the description herein, in some examples, this disclosure describes a method of operating an image senor and a plurality of memory cells associated with the image sensor, each memory cell comprising: one or more input lines, a stop exposure output line; a storage capacitor; and a stop exposure circuit. The method may comprise by each of the memory cells, sensing a voltage representing an exposure event in response to the input lines being enabled; by a first one of the memory cells, enabling the stop exposure output line in response to a charge on the storage capacitor satisfying a charge threshold; and stopping further exposure of the image sensor in response to the stop exposure output line being enabled for the first one of the memory cells.

In some examples, each memory cell includes a reset transistor coupled to the storage capacitor, the method further comprising: controlling the reset transistor to reset the charge on the storage capacitor to a nominal voltage in response to a reset of the memory array circuit. The stop exposure circuit may comprise a stop exposure transistor coupled to the reset transistor, wherein the stop exposure transistor is configured to turn on when the reset transistor is forced on, in response to a condition where the storage capacitor satisfies the threshold. Sensing the voltage representing the exposure event may include incrementally discharging the storage capacitor, in response to the exposure event when the input lines are enabled.

In some examples, each memory cell comprises a readout line and each memory cell includes a readout transistor configured as a buffer of the charge on the capacitor and an output transistor, the method further comprising: outputting the charge on the on the readout transistor in response to a readout input signal to the output transistor. Moreover, in some examples, the method may further comprise latching the address of a first memory cell of the plurality of memory cells, in response to the first memory cell of the plurality of memory cells selecting its stop exposure line. The method may further include stopping further exposure of the image sensor in response to an output of a logical OR circuit being enabled, indicating a condition where a given exposure line associated with a given one of the memory circuits is enabled.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

One or more aspects of the techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

One or more aspects of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a VR, an AR, a MR, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

The following clauses may demonstrate one or more examples of this disclosure.

Clause 1—A memory array circuit associated with an image sensor, the memory array circuit comprising a plurality of memory cells, each memory cell comprising: one or more input lines; a stop exposure output line; a storage capacitor configured to sense a voltage representing an exposure event when the input lines are enabled; and a stop exposure circuit configured to enable the stop exposure output line in response to a charge on the storage capacitor satisfying a charge threshold, wherein the stop exposure output line being enabled causes the image sensor to stop further exposure of the image sensor Clause 2—The memory array circuit of clause 1, wherein the one or more input lines include: a row select input line; a column select input line; an exposure event input line, wherein each of the memory cells is configured to sense the voltage representing the exposure event enabled on the exposure event input line when the column select input line and the row select input line are enabled.

Clause 3—The memory array circuit of clause 1 or 2, wherein the storage capacitor is configured to incrementally discharge, in response to the exposure event when the input lines are enabled.

Clause 4—The memory array circuit of any of clauses 1-3, wherein each memory cell includes a reset transistor coupled to the storage capacitor for resetting the charge on the storage capacitor to a nominal voltage in response to a reset of the memory array circuit, wherein the reset transistor is controlled by one or more switches.

Clause 5—The memory array circuit of clause 4, wherein the stop exposure circuit comprises a stop exposure transistor coupled to the reset transistor, wherein the stop exposure transistor is configured to turn on when the reset transistor is forced on, in response to a condition where the storage capacitor satisfies the threshold.

Clause 6—The memory array circuit of any of clauses 1-5, wherein each memory cell comprises a readout line and each memory cell includes a readout transistor configured as a buffer of the charge on the capacitor and an output transistor configured to output the charge on readout transistor in response to a readout input signal.

Clause 7—The memory array of any of clauses 1-6, wherein in response to a first memory cell of the plurality of memory cells selecting its stop exposure output line, a logical circuit latches the address of the first memory cell.

Clause 8—The memory array circuit of any of clauses 1-7, further comprising a logical OR circuit configured to receive the stop exposure lines of each of the memory cells, wherein the image sensor is configured to stop further exposure of the image sensor in response to an output of the logical OR circuit being enabled, indicating a condition where a given exposure line associated with a given one of the memory circuits is enabled.

Clause 9—A method of operating an image sensor and a plurality of memory cells associated with the image sensor, each memory cell comprising: one or more input lines, a stop exposure output line; a storage capacitor; and a stop exposure circuit, the method comprising: by each of the memory cells, sensing a voltage representing an exposure event in response to the input lines being enabled; by a first one of the memory cells, enabling the stop exposure output line in response to a charge on the storage capacitor satisfying a charge threshold; and stopping further exposure of the image sensor in response to the stop exposure output line being enabled for the first one of the memory cells.

Clause 10—The method of clause 9, wherein the one or more input lines include: a row select input line; a column select input line; and an exposure event input line, the method further comprising: for each of the memory cells, sensing the voltage representing the exposure event enabled on the exposure event input line when the column select input line and the row select input line are enabled.

Clause 11—The method of clause 9 or 10, wherein each memory cell includes a reset transistor coupled to the storage capacitor, the method further comprising: controlling the reset transistor to reset the charge on the storage capacitor to a nominal voltage in response to a reset of the memory array circuit.

Clause 12—The method of clause 11, wherein the stop exposure circuit comprises a stop exposure transistor coupled to the reset transistor, wherein the stop exposure transistor is configured to turn on when the reset transistor is forced on, in response to a condition where the storage capacitor satisfies the threshold.

Clause 13—The method of any of clauses 9-12, further comprising incrementally discharging the storage capacitor, in response to the exposure event when the input lines are enabled.

Clause 14—The method of any of clauses 9-13, wherein each memory cell comprises a readout line and each memory cell includes a readout transistor configured as a buffer of the charge on the capacitor and an output transistor, the method further comprising: outputting the charge on the on the readout transistor in response to a readout input signal to the output transistor.

Clause 15—The method of any of clauses 9-14, further comprising: latching the address of a first memory cell of the plurality of memory cells, in response to the first memory cell of the plurality of memory cells selecting its stop exposure line.

Clause 16—The method of any of clauses 9-15, the method further comprising: stopping further exposure of the image sensor in response to an output of a logical OR circuit being enabled, indicating a condition where a given exposure line associated with a given one of the memory circuits is enabled.

Clause 17—A SoC integrated circuit comprising: logic circuitry associated with an image sensor; and a memory array circuit associated with the image sensor, the memory array circuit comprising a plurality of memory cells, each memory cell comprising: one or more input lines; a stop exposure output line; a storage capacitor configured to sense a voltage representing an exposure event on the exposure event input line when the input lines are enabled; and a stop exposure circuit configured to enable the stop exposure output line in response to a charge on the storage capacitor satisfying a charge threshold, wherein the logic circuitry is configured to stop further exposure of the image sensor in response to the stop exposure line being enabled.

Clause 18—The SOC integrated circuit of clause 17, wherein the input lines include: a row select input line; a column select input line; and an exposure event input line, wherein each of the memory cells is configured to sense the voltage representing the exposure event on the exposure event input line when the column select input line and the row select input line are enabled.

Clause 19—The SOC integrated circuit of clause 17 or 18, wherein the storage capacitor is configured to incrementally discharge, in response to the exposure event when the one or more input lines are enabled.

Clause 20—The SOC integrated circuit of claim any of clauses 17-19, wherein each memory cell includes a reset transistor coupled to the storage capacitor for resetting the charge on the storage capacitor to a nominal voltage in response to a reset of the memory array circuit, wherein the reset transistor is controlled by one or more switches.

Clause 21—The SOC integrated circuit of clause 20, wherein the stop exposure circuit comprises a stop exposure transistor coupled to the reset transistor, wherein the stop exposure transistor is configured to turn on when the reset transistor is forced on, in response to a condition where the storage capacitor satisfies the threshold.

Clause 22—The SOC integrated circuit of any of clauses 17-21, wherein each memory cell comprises a readout line and each memory cell includes a readout transistor configured as a buffer of the charge on the capacitor and an output transistor configured to output the charge on readout transistor in response to a readout input signal.

Clause 23—The SOC integrated circuit of any of clauses 17-22, wherein in response to a first memory cell of the plurality of memory cells selecting its stop exposure output line, the logic circuitry is further configured to latch the address of the first memory cell.

Clause 24—The SOC integrated circuit of any of clauses 17-23, wherein the logic circuitry includes a logical OR circuit configured to receive the stop exposure output lines of each of the memory cells, wherein the logic circuitry is configured to stop further exposure of the image sensor in response to an output of the logical OR circuit being enabled, indicating a condition where a given exposure line associated with a given one of the memory circuits is enabled.

Clause 25—An AR system comprising: a display screen for a HMD; and at least one SoC connected to the HMD and configured to output artificial reality content on the HMD display screen, wherein the at least one SoC comprises: logic circuitry associated with an image sensor; and a memory array circuit associated with the image sensor, the memory array circuit comprising a plurality of memory cells, each memory cell comprising: one or more input lines; a stop exposure output line; a storage capacitor configured to sense a voltage representing an exposure event on the exposure event input line when the input lines are enabled; and a stop exposure circuit configured to enable the stop exposure output line in response to a charge on the storage capacitor satisfying a charge threshold, wherein the logic circuitry is configured to stop further exposure of the image sensor in response to the stop exposure line being enabled.

Clause 26—The AR system of clause 25 in combination with the SOC of any of clauses 17-24.

Clause 27—A system comprising a plurality of circuits, wherein each of the plurality of circuits includes a capacitor and wherein each of the plurality of circuits is configured to: receive control signals, wherein the control signals determine an address associated with one or more of the plurality of circuits and wherein the control signals identify events; incrementally discharge the capacitor for a particular one of the plurality of circuits in response to the control signals when the address identifies the particular circuit during an event; and output a logic signal in response to the capacitor of the particular one of the plurality of circuits reaching a defined level of charge, wherein the defined level of charge corresponds to a pre-defined threshold lower than an initial reset charge level of the capacitor, wherein the system further includes logic configured to: receive the logic signal from the particular one of the plurality of circuits; and identify the particular one of the plurality of circuits as having received the most events from among the plurality of circuits.

Clause 28—The system of clause 27, wherein the system is configured to disable or reset the plurality of circuits in response to the logic receiving the logic signal from the particular one of the plurality of circuits.

Clause 29—The system of clause 27 or 29, wherein the capacitor of the particular one of the plurality of circuits reaching the defined level of charge causes a threshold voltage of a transistor to be exceeded, thereby outputting the logic signal.

What is claimed is:

1. A memory array circuit associated with an image sensor, the memory array circuit comprising a plurality of memory cells, each memory cell comprising:
   one or more input lines;
   a storage capacitor configured to sense a voltage representing an exposure event when the input lines are enabled;
   a stop exposure output line that, when enabled, causes the image sensor to stop further exposure of the image sensor;
   a stop exposure circuit configured to enable the stop exposure output line in response to a charge on the storage capacitor satisfying a charge threshold; and
   a reset transistor coupled to the storage capacitor and configured to conditionally reset the charge on the storage capacitor to a nominal voltage based at least in part on a set of switches comprising:
   a first switch configured to conditionally couple a gate of the reset transistor to a positive voltage node; and
   a second switch configured to conditionally couple a terminal of the reset transistor to the positive voltage node.

2. The memory array circuit of claim 1, wherein the one or more input lines include:
   a row select input line;
   a column select input line; and
   an exposure event input line,
   wherein each of the memory cells is configured to sense the voltage representing the exposure event on the exposure event input line when the column select input line and the row select input line are enabled.

3. The memory array circuit of claim 1, wherein the storage capacitor is configured to incrementally discharge in response to the exposure event when the input lines are enabled.

4. The memory array circuit of claim 1, wherein the stop exposure circuit comprises a stop exposure transistor coupled to the reset transistor, wherein the stop exposure transistor is configured to turn on when the reset transistor is forced on in response to a condition where the storage capacitor satisfies the threshold.

5. The memory array circuit of claim 1, wherein each memory cell comprises a readout line and each memory cell includes a readout transistor configured as a buffer of the charge on the capacitor and an output transistor configured to output the charge on the readout transistor in response to a readout input signal.

6. The memory array circuit of claim 1, wherein in response to a first memory cell of the plurality of memory cells selecting its stop exposure output line, a logical circuit latches an address of the first memory cell.

7. The memory array circuit of claim 1, further comprising a logical OR circuit configured to receive the stop exposure output lines of each of the memory cells, wherein the image sensor is configured to stop further exposure of the image sensor in response to an output of the logical OR circuit being enabled, indicating a condition where a given exposure line associated with a given one of the memory circuits is enabled.

8. The memory array circuit of claim 1, further comprising a third switch configured to conditionally couple the gate of the reset transistor to a reference voltage node that differs from the positive voltage node.

9. A method comprising:
configuring a storage capacitor included in a memory cell of a memory array circuit to sense a voltage representing an exposure event when one or more input lines are enabled;
configuring a stop exposure output line of the memory cell such that, when enabled, the stop exposure output line causes an image sensor associated with the memory array circuit to stop further exposure of the image sensor;
configuring a stop exposure circuit included in the memory cell to enable the stop exposure output line in response to a charge on the storage capacitor satisfying a charge threshold;
coupling a reset transistor included in the memory cell to the storage capacitor; and
configuring the reset transistor to conditionally reset the charge on the storage capacitor to a nominal voltage based at least in part on a set of switches comprising:
a first switch configured to conditionally couple a gate of the reset transistor to a positive voltage node; and
a second switch configured to conditionally couple a terminal of the reset transistor to the positive voltage node.

10. The method of claim 9, wherein the one or more input lines include: a row select input line; a column select input line; and an exposure event input line, the method further comprising:
configuring the memory cell to sense the voltage representing the exposure event enabled on the exposure event input line when the column select input line and the row select input line are enabled.

11. The method of claim 9, wherein the stop exposure circuit comprises a stop exposure transistor coupled to the reset transistor, wherein the stop exposure transistor is configured to turn on when the reset transistor is forced on in response to a condition where the storage capacitor satisfies the charge threshold.

12. The method of claim 9, further comprising incrementally discharging the storage capacitor in response to the exposure event when the input lines are enabled.

13. The method of claim 9, wherein each memory cell comprises a readout line and each memory cell includes a readout transistor configured as a buffer of the charge on the capacitor and an output transistor, the method further comprising:
outputting the charge on the on the readout transistor in response to a readout input signal to the output transistor.

14. The method of claim 9, further comprising:
latching an address of the memory cell in response to the memory cell selecting its stop exposure output line.

15. The method of claim 9, the method further comprising:
stopping further exposure of the image sensor in response to an output of a logical OR circuit being enabled, indicating a condition where a given exposure line associated with a given one of the memory circuits is enabled.

16. An artificial reality (AR) system comprising:
a head mounted display (HMD) that includes a display screen configured to present artificial reality content to a user; and
circuitry that is coupled to the HMD and comprises a memory array circuit associated with an image sensor, the memory array circuit including memory cell that comprises:
one or more input lines;
a storage capacitor configured to sense a voltage representing an exposure event when the input lines are enabled;
a stop exposure output line that, when enabled, causes the image sensor to stop further exposure of the image sensor;
a stop exposure circuit configured to enable the stop exposure output line in response to a charge on the storage capacitor satisfying a charge threshold; and
a reset transistor coupled to the storage capacitor and configured to conditionally reset the charge on the storage capacitor to a nominal voltage based at least in part on a set of switches comprising:
a first switch configured to conditionally couple a gate of the reset transistor to a positive voltage node; and
a second switch configured to conditionally couple a terminal of the reset transistor to the positive voltage node.

17. The AR system of claim 16, wherein the storage capacitor is configured to incrementally discharge in response to the exposure event when the input lines are enabled.

18. The AR system of claim 16, wherein the stop exposure circuit comprises a stop exposure transistor coupled to the reset transistor, wherein the stop exposure transistor is configured to turn on when the reset transistor is forced on in response to a condition where the storage capacitor satisfies the threshold.

* * * * *